United States Patent [19]
Murayama et al.

[11] Patent Number: 5,424,006
[45] Date of Patent: Jun. 13, 1995

[54] PHOSPHORESCENT PHOSPHOR

[75] Inventors: Yoshihiko Murayama; Nobuyoshi Takeuchi; Yasumitsu Aoki; Takashi Matsuzawa, all of Tokyo, Japan

[73] Assignee: Nemoto & Co., Ltd., Tokyo, Japan

[21] Appl. No.: 202,001

[22] Filed: Feb. 25, 1994

[30] Foreign Application Priority Data

Apr. 28, 1993 [JP] Japan .................. 5-103310
Jan. 21, 1994 [JP] Japan .................. 6-004984

[51] Int. Cl.6 ............................. C09K 11/80
[52] U.S. Cl. ............................. 252/301.4 R
[58] Field of Search ...................... 252/301.4 R

[56] References Cited

U.S. PATENT DOCUMENTS 3,294,699 12/1966 Lange .................. 252/301.4 R
3,502,592 3/1970 Amster ................. 252/301.4 R
3,595,802 7/1971 Blasse ................. 252/301.4 R

FOREIGN PATENT DOCUMENTS 0094132 11/1983 European Pat. Off. .
56-2116 1/1981 Japan .................. 252/301.4 R
56-152883 11/1981 Japan .................. 252/301.4 R Primary Examiner—Mark L. Bell
Assistant Examiner—C. M. Bonner
Attorney, Agent, or Firm—Longacre & White

[57] ABSTRACT

A phosphorescent phosphor according to the present invention includes a matrix expressed by $MAl_2O_4$ in which M is at least one metal element selected from a group consisting of calcium, strontium and barium. Alternatively, a phosphorescent phosphor according to the present invention includes a matrix expressed by $MAl_2O_4$ in which M is plural metal elements which are composed of magnesium and at least one metal element selected from a group consisting of calcium, strontium and barium and europium is added as an activator, further, co-activator is added.

4 Claims, 18 Drawing Sheets

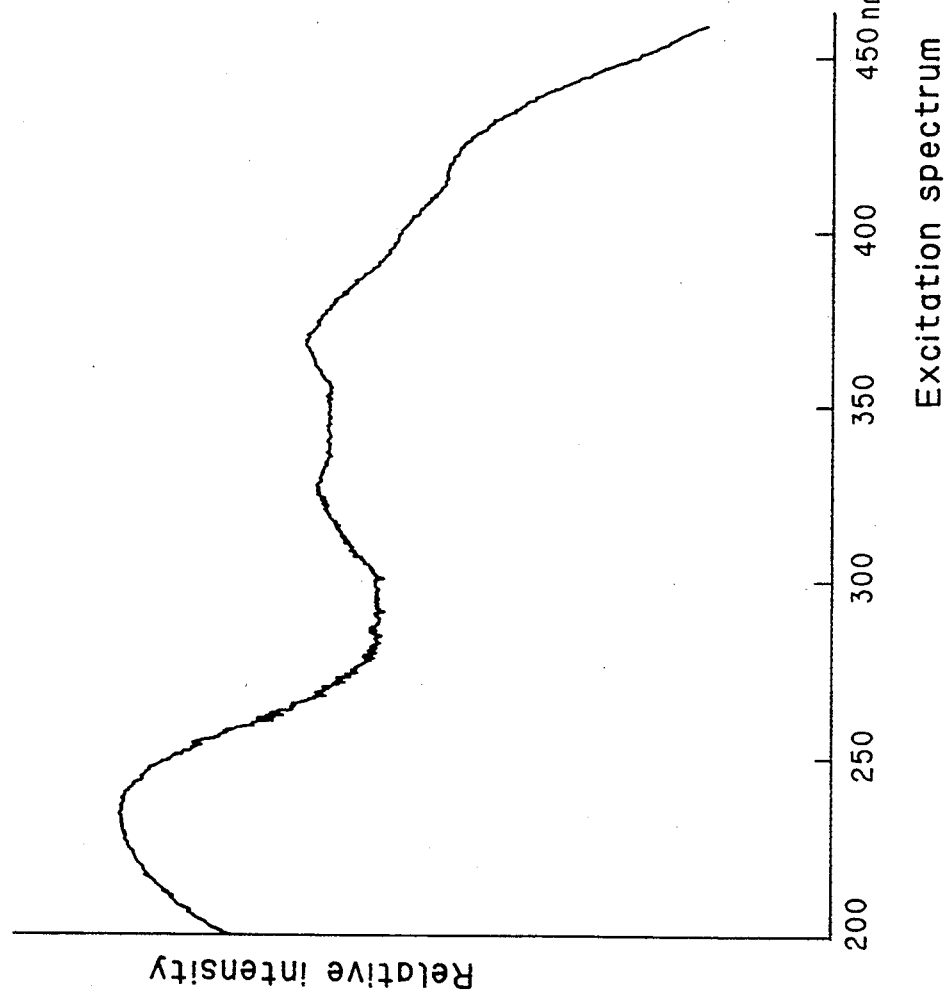
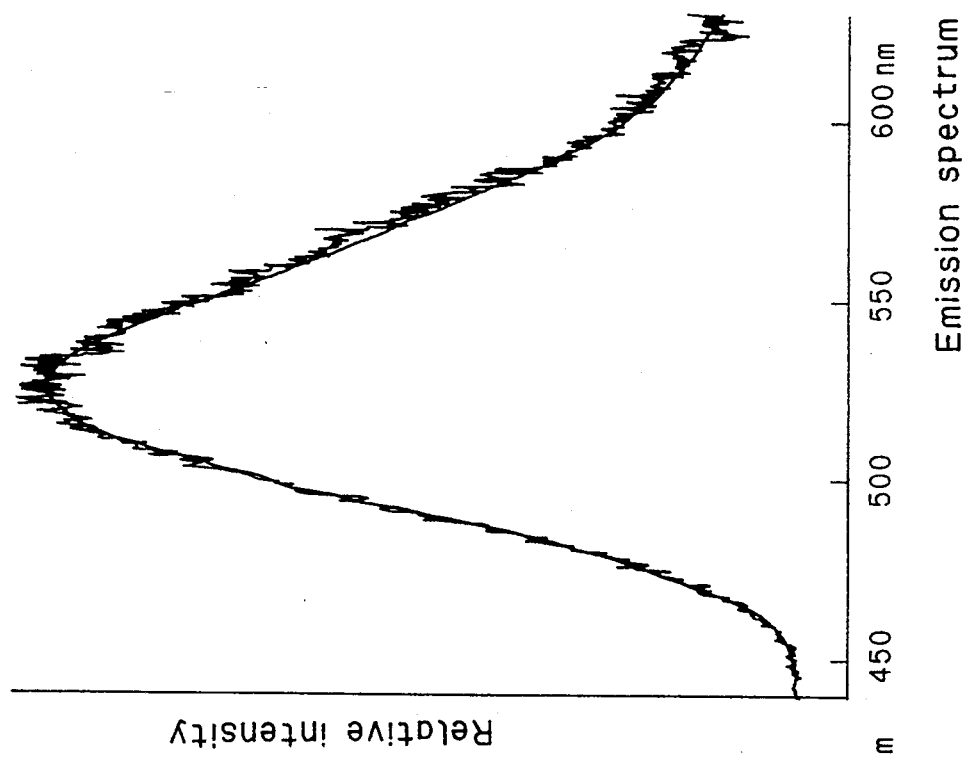

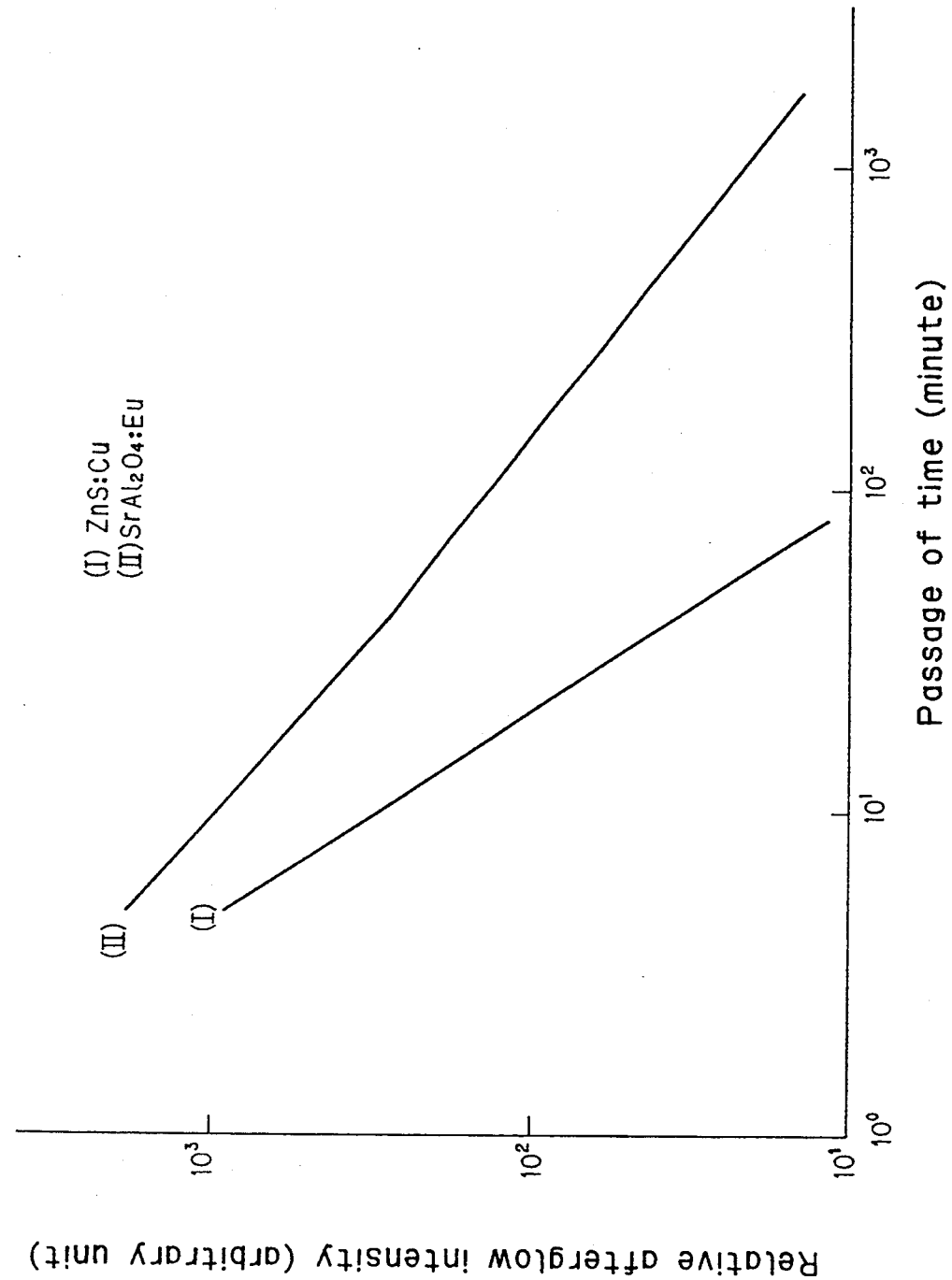

(I) 20 seconds after irradiation of D65 standard light for 2 seconds
(II) 20 seconds after irradiation of D65 standard light for 4 seconds
(III) 20 seconds after irradiation of D65 standard light for 8 seconds
(IV) 20 seconds after irradiation of D65 standard light for 20 seconds (I) 20 seconds after irradiation of D65 standard light for 1 second
(II) 20 seconds after irradiation of D65 standard light for 2 seconds
(III) 20 seconds after irradiation of D65 standard light for 4 seconds (I) 20 seconds after irradiation of D65 standard light for 2 seconds
(II) 20 seconds after irradiation of D65 standard light for 4 seconds
(III) 20 seconds after irradiation of D65 standard light for 6 seconds

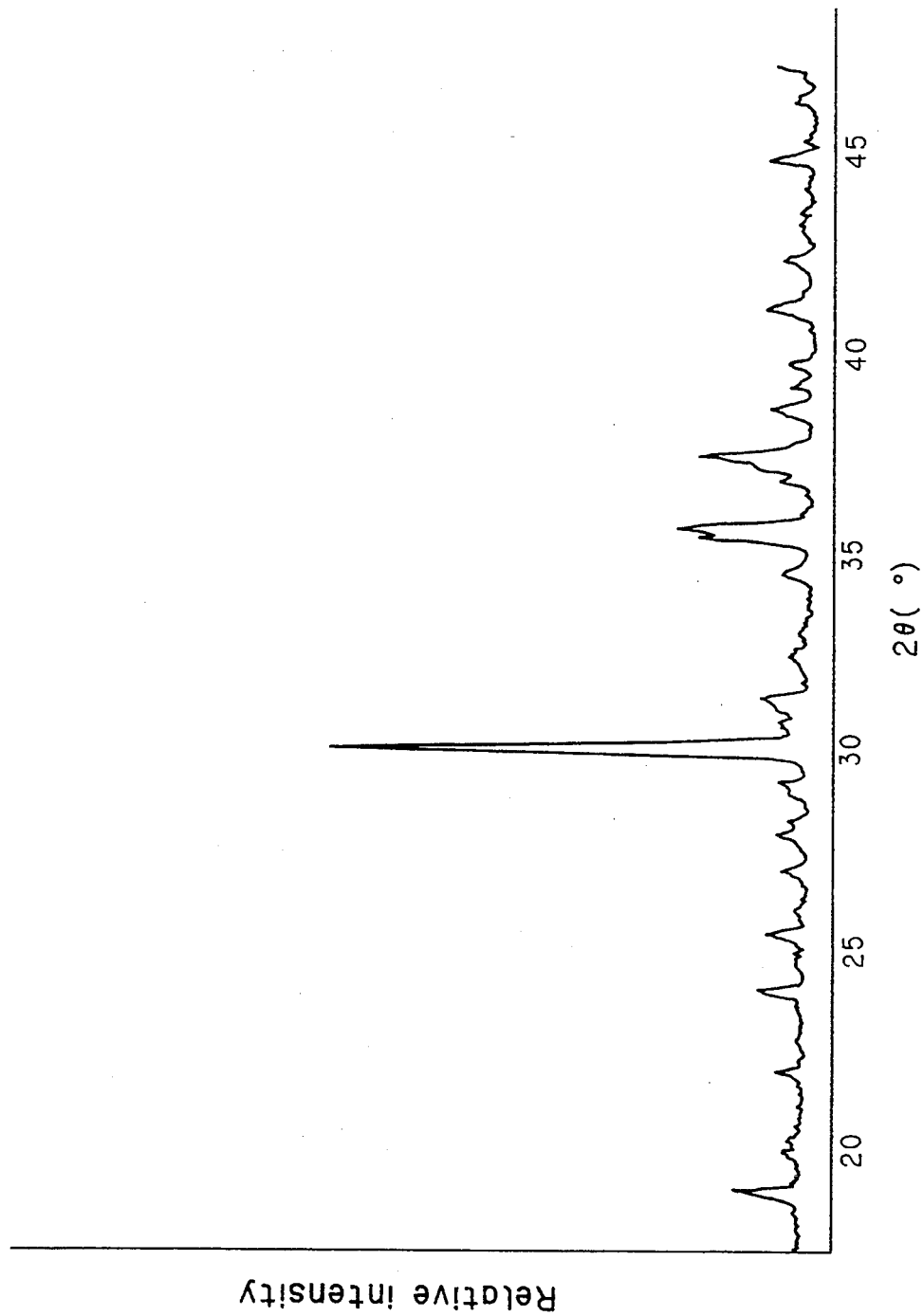

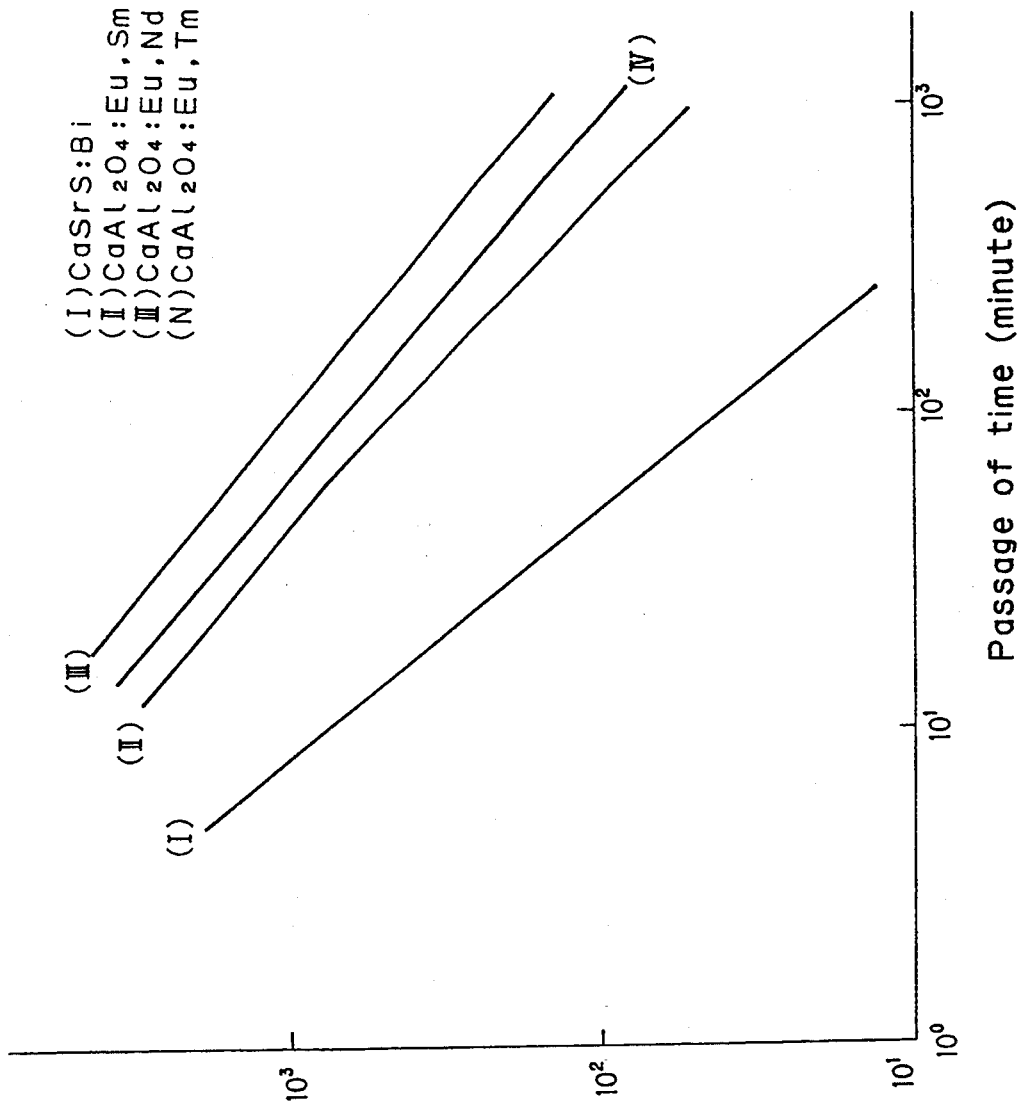

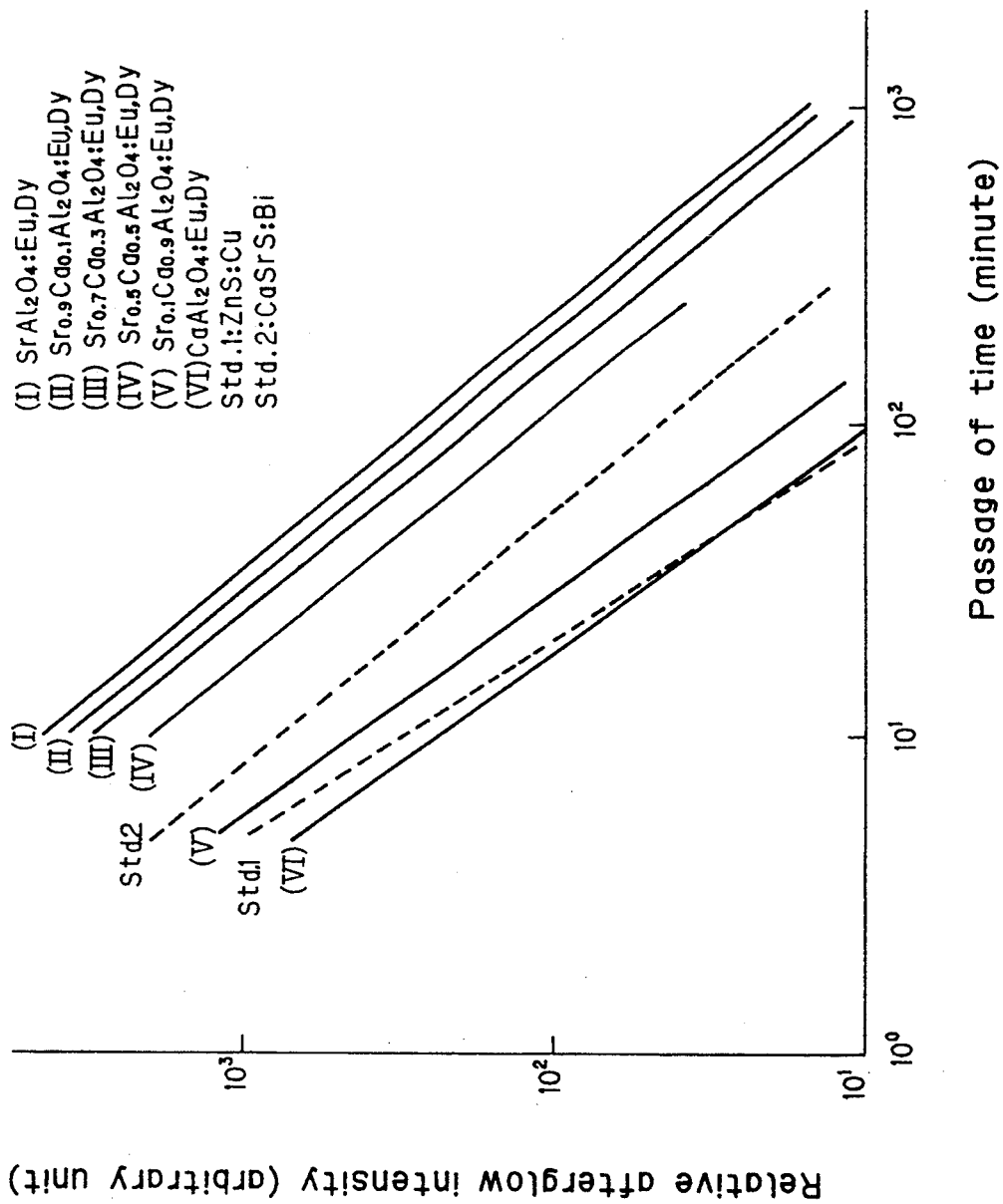

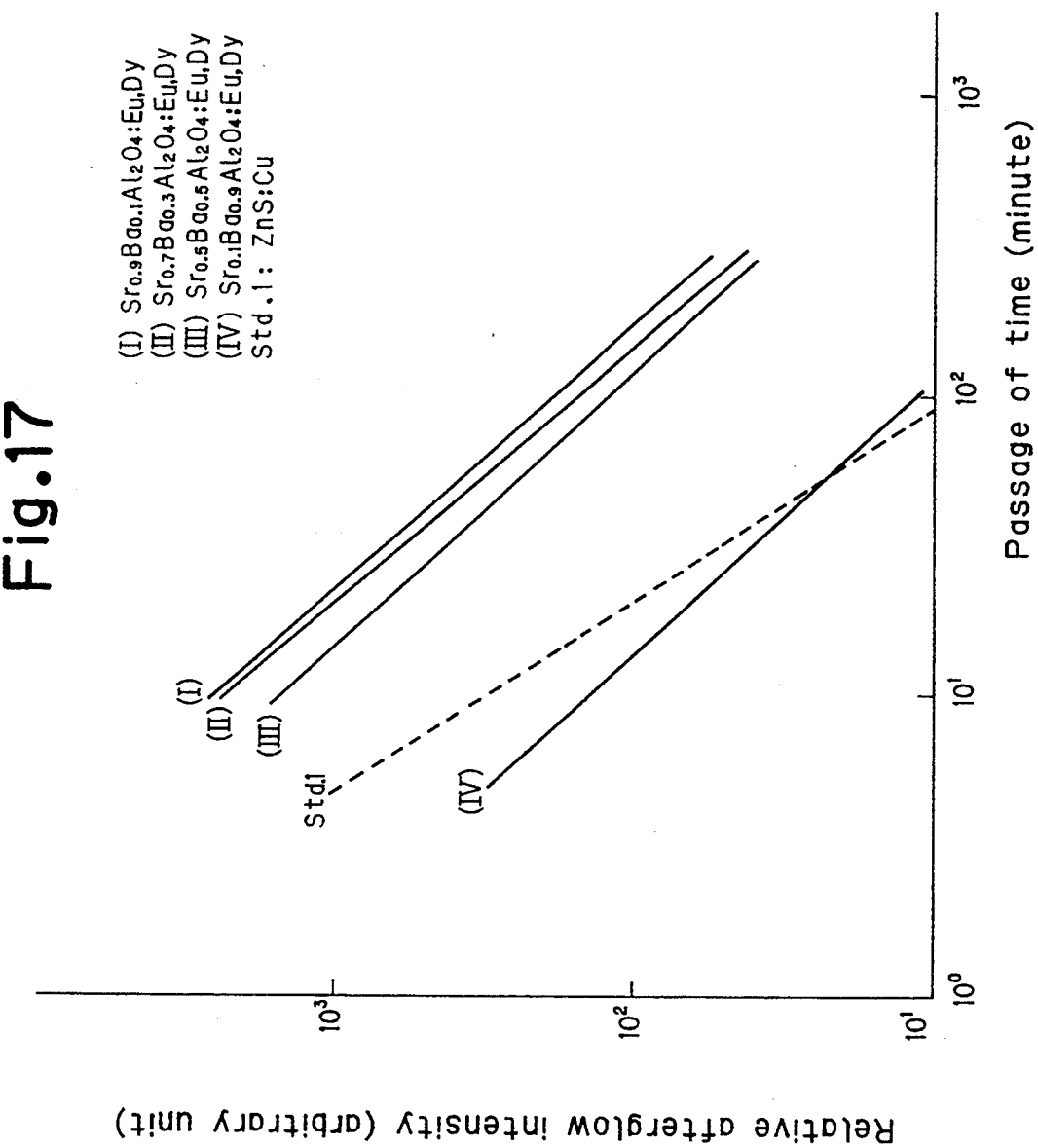

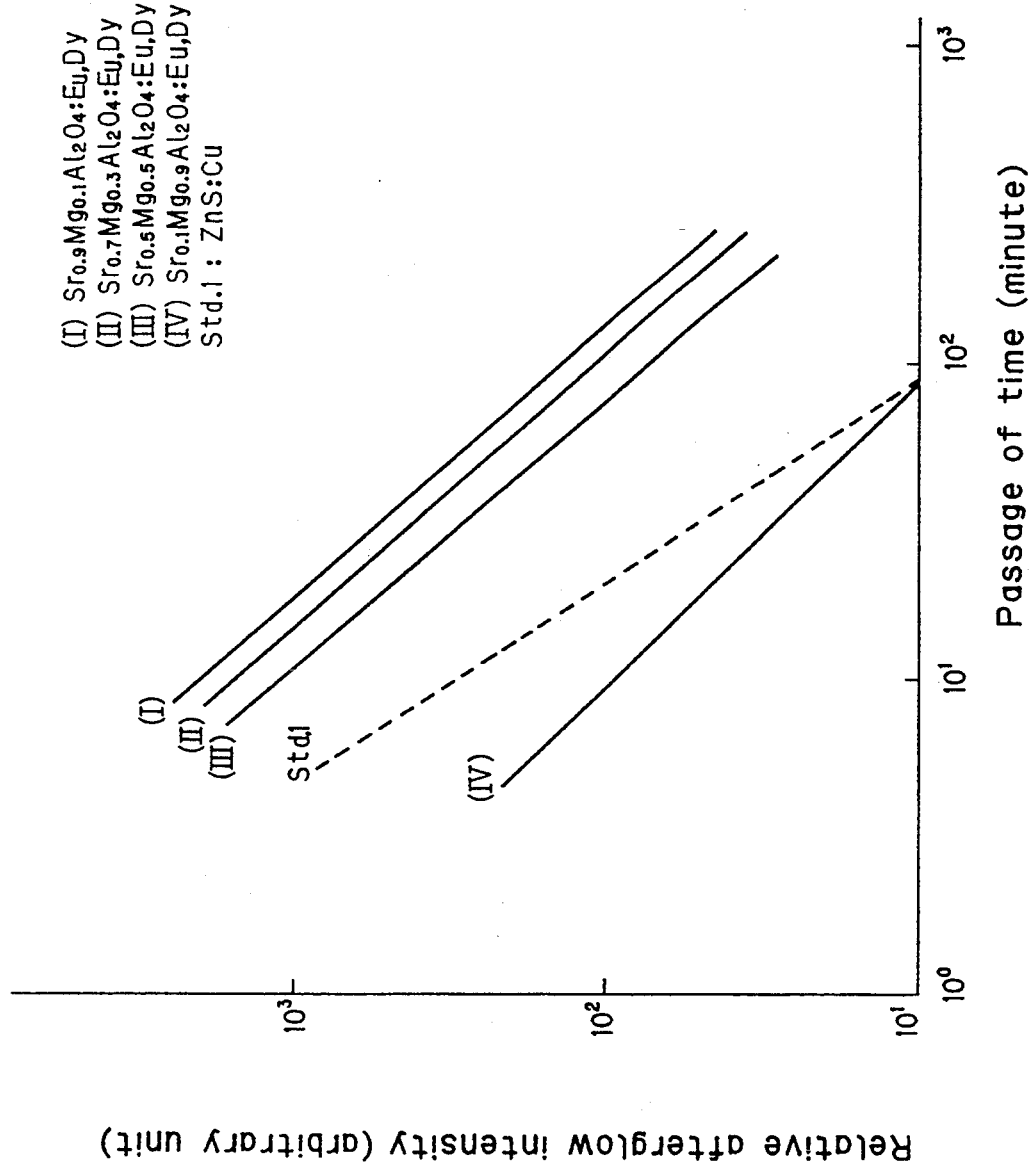

PHOSPHORESCENT PHOSPHOR

BACKGROUND OF THE INVENTION

The present invention relates to a phosphorescent phosphor, and more particularly, to a novel phosphorescent phosphor which shows excellent photo-resistance required for the phosphorescent phosphor to be utilized both indoors and outdoors mainly as a night-time display, and which shows an extremely long afterglow characteristics.

Generally, the afterglow time of a fluorescent substance is short, i.e., the light emitted from the fluorescent substance decays immediately after removal from the source of excitation. Unlike such a fluorescent substance, some substances emit light after having absorbed ultraviolet radiation or the like and afterglow thereof that can be visually observed continues for a considerable time (ranging from several tens of minutes to several hours) after the source of stimulus is cut off. Such substances are called phosphorescent phosphors.

As phosphorescent phosphors, sulfide phosphorescent phosphors are known. Examples of sulfide phosphorescent phosphors include CaS:Bi (which emits light of violet blue), CaStS:Bi (which emits light of blue), ZnS:Cu (which emits light of green) and ZnCdS:Cu (which emits light of yellow or orange). However, any of these sulfide phosphorescent phosphors is chemically unstable and shows degraded light resistance, i.e., it suffers from problems that must be solved for practical use.

The most extensively used phosphorescent phosphor among such sulfide phosphorescent phosphors is zinc sulfide phosphorescent phosphor (ZnS:Cu). However, zinc sulfide phosphorescent phosphor is decomposed as the result of irradiation by ultraviolet radiation in the presence of moisture and thus blackens or reduces the luminance thereof. Therefore, it is difficult to use this phosphorescent phosphor in fields where it is placed outdoors and exposed to a direct sunlight, that is, application thereof is limited to luminous clocks/watches or clocks/watches and instrument dials, evacuation guiding signs or indoor night-time display.

Even when zinc sulfide phosphorescent phosphor is used for a luminous clock, since the afterglow thereof which allows the time to be visually recognized lasts only from 30 minutes to 2 hours, a radioactive substance must be doped to the phosphorescent phosphor and a self-luminous paint which keeps emitting light by absorbing an energy of radiation from radioactive substance must be employed.

SUMMARY OF THE INVENTION

In view of the aforementioned problems of the prior art, an object of the present invention is to provide a phosphorescent phosphor which shows afterglow characteristics that last much longer than those of presently available sulfide phosphorescent phosphors, and which is chemically stable and shows excellent photo-resistance over a long time.

The present inventors took note of alkaline earth metal type aluminate activated by europium or the like, which is a novel phosphorescent phosphor completely different from conventional sulfide phosphorescent phosphors, conducted various experiments, and discovered that this phosphorescent phosphor showed afterglow characteristics which lasted much longer than those of currently available sulfide phosphorescent phosphors and was chemically stable and showed excellent photo-resistance due to an oxide. Therefore, the present inventors came to the conclusion that this phosphorescent phosphors could solve all the problems of the prior art and could thus be employed in various applications as a luminous paint or pigment which could be visually recognized for a night without containing radioactivity.

To achieve the above-described object, the present invention provides a phosphorescent phosphor which comprises a compound expressed by $MAl_2O_4$ whose host material is a compound in which M is at least one metal element selected from a group consisting of calcium, strontium and barium.

The present invention further provides a phosphorescent phosphor which comprises a compound expressed by $MAl_2O_4$ whose host material is a compound composed of a plurality of metal elements in which M is at least one metal element selected from a group consisting of calcium, strontium and barium to which magnesium is added.

In a preferred form, 0.001 mol % to 10 mol % of europium may be doped to the matrix expressed by $MAl_2O_4$ as an activator in terms of mol % relative to the metal element expressed by M.

In another preferred form, 0.001 mol % to 10 mol % of at least one element selected from a group consisting of lanthanum, cerium, praseodymium, neodymium, samarium, gadolinium, terbium, dysprosium, holmium, erbium, thulium, ytterbium, lutetium, manganese, tin and bismuth may be doped to the compound expressed by $MAl_2O_4$ as a co-activator in terms of mol % relative to the metal element expressed by M.

In still another preferred form, the phosphorescent phosphor may show a glow peak of thermo-luminescence in a high-temperature region of 50° C. or above when irradiated by ultraviolet or visible rays having a wavelength of 200 to 450 nm at room temperatures.

Additionally, it is possible to add 1–10 % by weight of boric acid as flux to the starting material to perform the aforementioned syntheses of the phosphorescent phosphors. In this case, if the amount of flux is less than 1% by weight, the effect of flux vanishes and if the amount of flux exceeds 10% by weight, flux is solidified, so that it becomes difficult to perform the milling and sieving which must be performed later.

BRIEF DESCRIPTION OF THE DRAWINGS

FIG. 2 is a graph showing the excitation spectrum of $SrAl_2O_4$:Eu phosphorescent phosphor and the emission spectrum thereof obtained 30 minutes after cessation of excitation;

FIG. 3 is a graph showing the results of the comparison between the afterglow characteristics of $SrAl_2O_4$:Eu phosphorescent phosphor and the afterglow characteristics of Zn S:Cu phosphorescent phosphor;

FIG. 8 is a graph showing the results of analysis of the crystal structure of $CaAl_2O_4$:Eu phosphorescent phosphor by XRD;

FIG. 12 is a graph showing the results of the comparison between the afterglow characteristics of $CaAl_2O_4$:Eu, Sm phosphorescent phosphor and $CaAl_2O_4$:Eu, Nd phosphorescent phosphor and the afterglow characteristics of Zn S:Cu phosphorescent phosphor;

FIG. 16 is a graph showing the results of the comparison between the afterglow characteristics of $Sr_xCa_{1-x}Al_2O_4$:Eu, Dy phosphorescent phosphor and the afterglow characteristics of ZnS:Cu phosphorescent phosphor and CaSrS:Bi phosphorescent phosphor;

FIG. 17 is a graph showing the results of the comparison between the afterglow characteristics of $Sr_xBa_{1-x}Al_2O_4$:Eu, Dy phosphorescent phosphor and the afterglow characteristics of ZnS:Cu phosphorescent phosphor; and FIG. 18 is a graph showing the results of the comparison between the afterglow characteristics of $Sr_xMg_{1-x}Al_2O_4$:Eu, Dy phosphorescent phosphor and the afterglow characteristics of ZnS:Cu phosphorescent phosphor.

DETAILED DESCRIPTION OF THE PREFERRED EMBODIMENTS

Examples of the present invention which is represented as $MAl_2O_4$, the examples differing from each other in terms of type (M) of a metal element, concentration of europium which is an activator or type and concentration of co-activator, will now be described below.

First, a phosphorescent phosphor which employs strontium as the metal element (M), which employs europium as an activator and which employs no co-activator will be described as example 1.

EXAMPLE 1

Synthesis of $SrAl_2O_4$:Eu phosphorescent phosphor and characteristics thereof

Sample 1-(1)

As an activator 1.76 g (0.005 mol) of europium oxide ($Eu_2O_3$) was added to 146.1 g (0.99 mol) of strontium carbonate having reagent grade and 102 g (1 mol) of alumina having reagent grade and, further, 5 g (0.08 mol) of boric acid was added as flux thereto. After the resultant mixture was sufficiently mixed using a ball mill, the sample was fired for 1 hour at 1300° C. in a stream of nitrogen-hydrogen mixture gas (97:3) (flow rate:0.1 liter/min) using an electric furnace. Thereafter, the sample was cooled to a room temperature for about 1 hour. The obtained powder compound was sieved having 100 mesh to obtain phosphorescent phosphor sample 1-(1).

Figure 1:
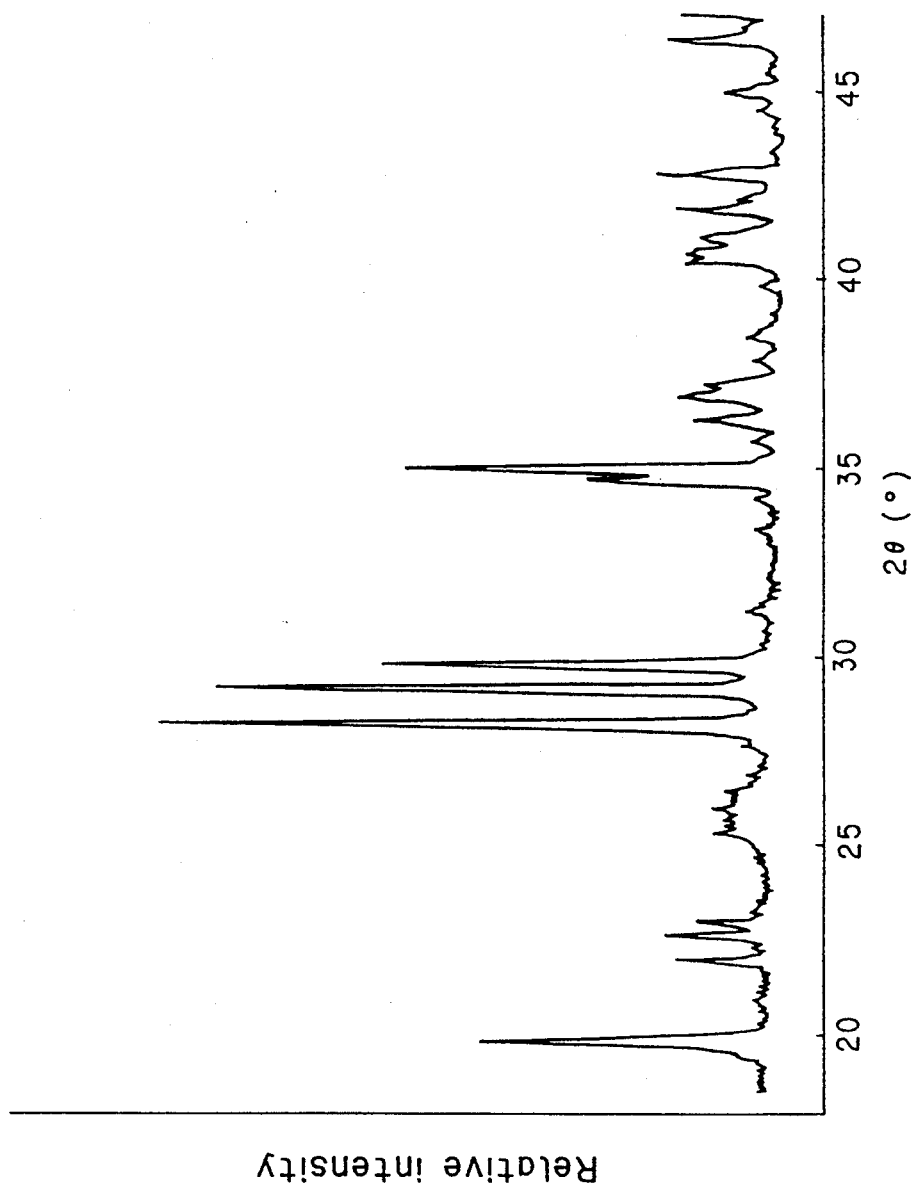
FIG. 1 is a graph showing the results of analysis of a crystal structure of $SrAl_2O_4$:Eu phosphorescent phosphor by XRD.

FIG. 1 shows the results of analysis of the crystal structure of the obtained phosphorescent phosphor by XRD (X-ray diffractiometry). It was discovered from the diffraction peak characteristics that the obtained phosphorescent phosphor was $SrAl_2O_4$ having spinel structure.

FIG. 2 shows the excitation spectrum of that phosphorescent phosphor and the afterglow emission spectrum thereof obtained after removal from the source of light.

From the same figure, it was made evident that the peak wavelength of the emission spectrum of $SrAl_2O_4$:Eu phosphorescent phosphor is about 520 mm which indicates green.

FIG. 3 and Table 2 show the results of the comparison between the measurements of the afterglow characteristics of the obtained $SrAl_2O_4$:Eu phosphorescent phosphor and those of ZnS:Cu phosphorescent phosphor which is available on the market and which emits light of green (manufactured by Nemoto & Co., LTD:trade mark:GSS, and the wavelength of emission peak:530 nm).

The afterglow characteristics were measured in the manner described below: 0.05 g of the obtained phosphorescent phosphor powder was taken on a sample plate having an inner diameter of 8 mm and made of aluminum (sample thickness : 0.1 $g/cm^2$), and that sample was left in the darkness for about 15 hours to remove afterglow. Thereafter, the sample was irradiated by a D65 standard light source at 200 lux for 10 minutes, and the obtained afterglow was measured using a luminance measuring device which employed a photo-multiplier.

As can be apparent from FIG. 3, the afterglow of $SrAl_2O_4$:Eu phosphorescent phosphor according to the present invention is highly bright and the decay thereof is slow. As the time passes, a difference in the intensity of afterglow between $SrAl_2O_4$:Eu Phosphorescent phosphor and ZnS:Cu phosphorescent phosphor increases. In FIG. 3, the broken line indicates the level of visually recognizable light intensity (corresponding to a luminance of about 0.3 $mCd/m^2$). It can be inferred from this broken line which indicates the afterglow characteristic of $SrAl_2O_4$:Eu phosphorescent phosphor that afterglow thereof will be recognized 24 hours later. When afterglow of $SrAl_2O_4$:Eu phosphorescent phosphor was actually measured 15 hours after excitation, it was observed as visually recognizable.

Table 2 shows the intensity of afterglow of sample 1-(1) which was measured 10 minutes, 30 minutes and 100 minutes after excitation, respectively, in terms of the relative value to the light intensity of ZnS:Cu phosphorescent phosphor. It can be seen from Table 2 that the afterglow luminance of $SrAl_2O_4$:Eu phosphorescent phosphor according to the present invention, measured 10 minutes after excitation, is 2.9 times that of ZnS:Cu phosphorescent phosphor, and that the afterglow luminance of $SrAl_2O_4$:Eu phosphorescent phosphor according to the present invention, measured 100 minutes after excitation, is 17 times that of ZnS:Cu phosphorescent phosphor.

Figure 4:
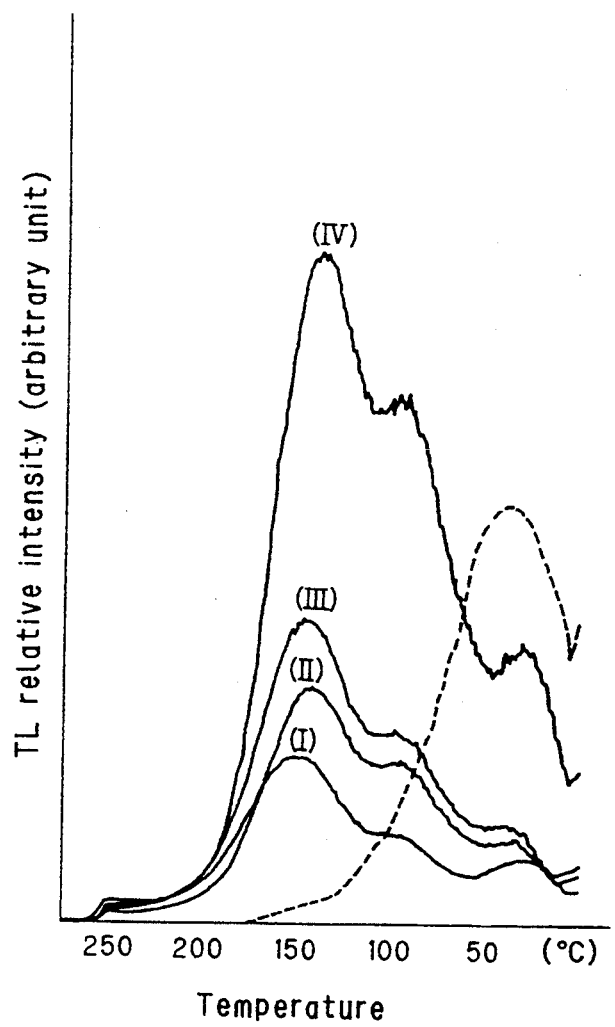
FIG. 4 is a graph showing the thermo-luminescence characteristics of $SrAl_2O_4$:Eu phosphorescent phosphor.

FIG. 4 shows the results of the examination of the thermo-luminescence characteristics (glow curves) of $SrAl_2O_4$:Eu phosphorescent phosphor which were measured when the phosphorescent phosphor was illuminated in a temperature range between the room temperature and 250° C. using a TLD reader (KYOKKO TLD-2000 system). It can be seen from FIG. 4 that the thermo-luminescence characteristics of the phosphorescent phosphor according to the present invention have three glow peaks at about 40° C., 90° C. and 130° C., and that the peak at 130° C. is the main glow peak. The glow curve of ZnS:Cu phosphorescent phosphor, indicated by the broken line in FIG. 4, peak at about 40° C. It is considered that a deep trapping level of $SrAl_2O_4$:Eu phosphorescent phosphor, corresponding to a high temperature of 50° C. or above, increases the time constant of afterglow, and thus enhances the afterglow characteristics over a long time.

Samples 1-(2) through 1-(7)

$SrAl_2O_4$:Eu phosphorescent phosphor samples (sample 1-(2) through 1-(7)) having compositions shown in Table 1 were manufactured in the same manner as that of sample 1-(1) with the exception that the concentration of europium was altered, as shown in Table 1.

TABLE 1

| | Material Mixing Ratio | | |
|---|---|---|---|
| Sample | Strontium carbonate | Alumina | Europium |
| Sample 1-(2) | 0.99998 mol | 1.0 mol | 0.00001 mol |
| (3) | 0.9999 | 1.0 | 0.00005 |
| (4) | 0.995 | 1.0 | 0.0025 |
| (5) | 0.97 | 1.0 | 0.015 |
| (6) | 0.90 | 1.0 | 0.05 |
| (7) | 0.80 | 1.0 | 0.1 |

The results of the examination of the afterglow characteristics of these samples 1-(2) through 1-(7), together with those of sample 1-(1), are shown in Table 2.

It can be seen from Table 2 that if the amount of added Eu is between 0.0025 mol and 0.05 mol, the afterglow characteristic of $SrAl_2O_4$ is more excellent than ZnS:Cu phosphorescent phosphor and the afterglow luminance 10 minutes after is also more excellent than ZnS:Cu phosphorescent phosphor. Furthermore, even when the proportion of Eu is 0.00001 mol or 0.1 mol, afterglow of $SrAl_2O_4$:Eu phosphorescent phosphor has a higher luminance than that of ZnS:Cu phosphorescent phosphor 30 minutes after excitation ceases.

Further, since Eu is expensive, if economy and deterioration in the afterglow characteristics due to concentration quenching are taken into consideration, addition of Eu at a proportion of 10 mol % or above is meaningless. Conversely, when judging in terms of afterglow characteristics, although the luminance of $SrAl_2O_4$ 10 minutes after excitation is lower than ZnS:Cu phosphorescent phosphor when the amount of Eu is between 0.00001 mol (0.001 mol %) and 0.00005 mol (0.005 mol %), it has a higher luminance than ZnS:Cu phosphorescent phosphor 10 minutes after cessation of excitation, thereby indicating that the effect of added Eu as an activator is evident.

Further, since $SrAl_2O_4$:Eu phosphorescent phosphor is an oxide, it is chemically stable and shows excellent photo-resistance when compared with conventional sulfide phosphorescent phosphors (see Tables 24, 25).

TABLE 2

| Sample | Luminance 10 minutes after | Luminance 30 minutes after | Luminance 100 minutes after |
|---|---|---|---|
| ZnS:Cu Std. | 1.00 | 1.00 | 1.00 |
| Sample 1-(1) | 2.90 | 6.61 | 17.0 |
| (2) | 0.41 | 1.20 | 3.10 |
| (3) | 0.56 | 1.50 | 4.80 |
| (4) | 2.40 | 4.50 | 13.5 |
| (5) | 3.01 | 7.04 | 19.2 |
| (6) | 1.10 | 2.70 | 10.3 |
| (7) | 0.32 | 1.11 | 3.02 |

Next, a phosphorescent phosphor which employs strontium as the metal element (M) and which employs europium as an activator and dysprosium as a co-activator will be described as example 2.

EXAMPLE 2

Synthesis of $SrAl_2O_4$:Eu, Dy phosphorescent phosphor and characteristics thereof Sample 2-(1)

As an activator and as a co-activator, 1.76 g (0.005 mol) of europium oxide ($Eu_2O_3$) and 1,87 g (0.005 mol) of dysprosium oxide ($Dy_2O_3$) were added, respectively to 144.6 g (0.98 mol) of strontium carbonate having reagent grade and 102 g (1 mol) of alumina having reagent grade. Further, for example, 5 g (0.08 mol) of boric acid is added thereto as flux. After the resultant mixture was sufficiently mixed using a ball mill, the sample was fired for 1 hour at 1300° C. in a stream of nitrogen-hydrogen mixture gas (97:3) (flow rate:0.1 liter/min) using an electric furnace. Thereafter, the sample was cooled to a room temperature for about 1 hour. The obtained powder compound was sieved having 100 mesh to obtain phosphorescent phosphor sample 2-(1).

The afterglow characteristics of this phosphorescent phosphor were examined in the same manner as that described above. The results of the examination are shown in sample 2-(1) of FIG. 5 and Table 4.

Figure 5:
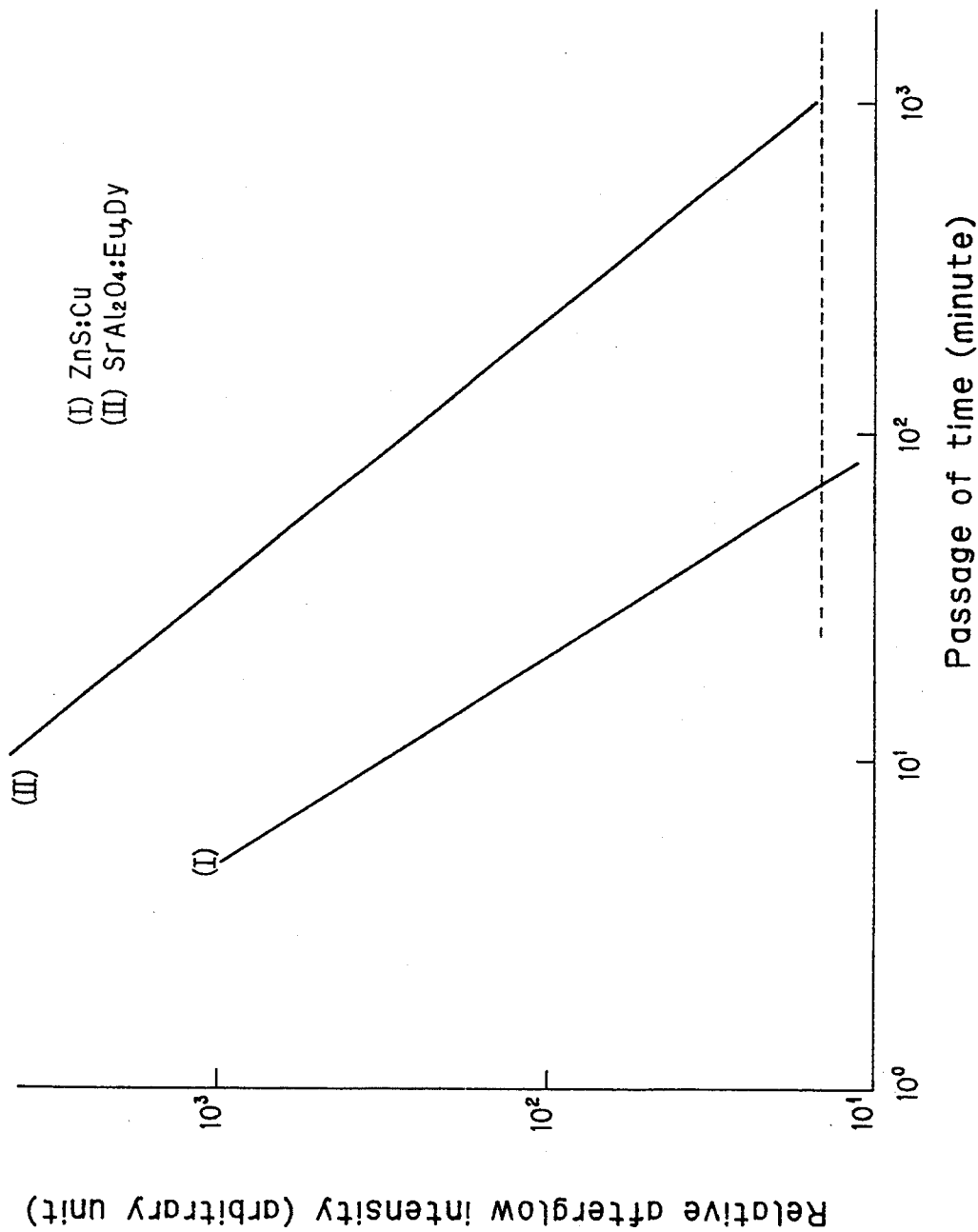
FIG. 5 is a graph showing the results of the comparison between the afterglow characteristics of $SrAl_2O_4$:Eu, Dy phosphorescent phosphor and the afterglow characteristics of ZnS:Cu phosphorescent phosphor.

As can be seen from FIG. 5, the afterglow luminance of $SrAl_2O_4$:Eu, Dy phosphorescent phosphor according to the present invention, particularly, the luminance of afterglow at an initial stage thereof is much higher than that of ZnS:Cu phosphorescent phosphor, and the decay time constant thereof is high. These indicate that $SrAl_2O_4$:Eu, Dy phosphorescent phosphor according to the present invention is an epoch-making high-luminance phosphorescent phosphor. It can be seen from both the visually recognizable afterglow intensity level and the afterglow characteristic of this $SrAl_2O_4$:Eu, Dy phosphorescent phosphor, shown in FIG. 5, that afterglow of this phosphorescent phosphor will be recognized even 16 hours later.

Table 4 shows the intensity of afterglow of sample 2-(1) which was measured 10 minutes, 30 minutes and 100 minutes, respectively after excitation in terms of the relative value to the afterglow luminescence intensity of ZnS:Cu phosphorescent phosphor. It can be seen from Table 4 that the afterglow luminance of $SrAl_2O_4$:Eu, Dy phosphorescent phosphor according to the present invention, measured 10 minutes after excitation, is 12.5 times that of ZnS:Cu phosphorescent phosphor, and that the afterglow luminance of $SrAl_2O_4$:Eu, Dy phosphorescent phosphor according to the present invention, measured 100 minutes after excitation, is 37 times that of ZnS:Cu phosphorescent phosphor.

Figure 6:
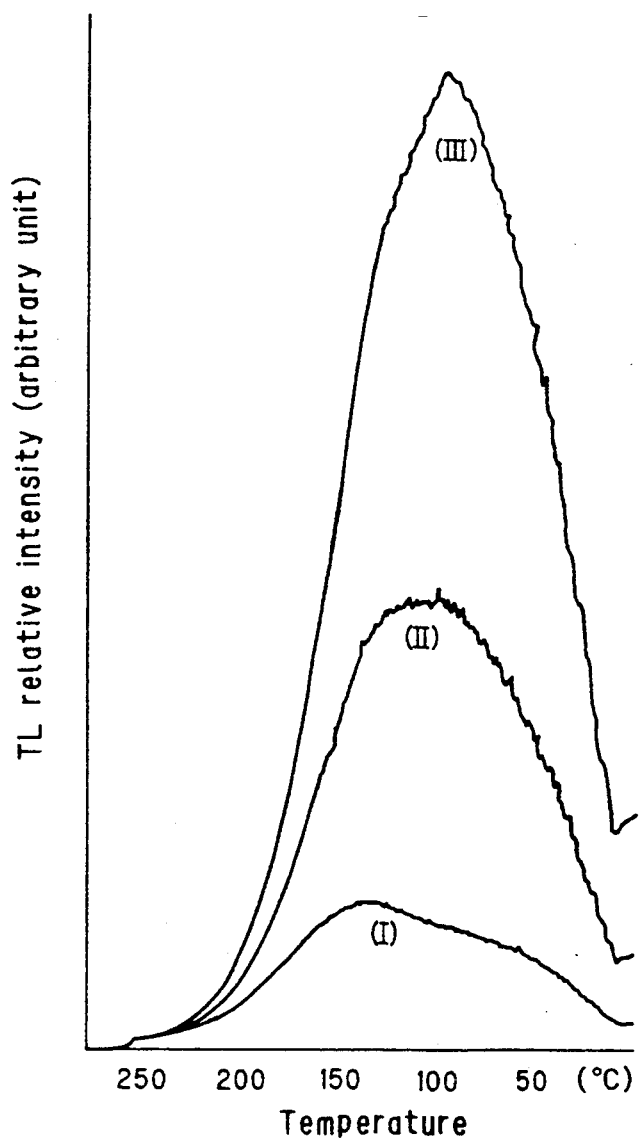
FIG. 6 is a graph showing the thermo-luminescence characteristics of $SrAl_2O_4$:Eu, Dy phosphorescent phosphor.

FIG. 6 shows the results of the examination of the thermo-luminescence characteristics (glow curves) of $SrAl_2O_4$:Eu, Dy phosphorescent phosphor previously irradiated which was conducted in a temperature range between the room temperature and 250° C. It can be seen from FIGS. 6 and 4 that addition of Dy as a co-activator has changed the main glow peak temperature of thermo-luminescence from 130° C. to 90° C. A high intensity of emission from the trapping level corresponding to 90° C. is considered the cause of a higher luminance of afterglow at the initial stage thereof than that of $SrAl_2O_4$:Eu phosphorescent phosphor.

Samples 2-(2) through 2-(7)

$SrAl_2O_4$:Eu, Dy phosphorescent phosphor samples (sample 2-(2) through 2-(7)) having compositions shown in Table 3 were manufactured in the same manner as that of sample 2-(1) with the exception that the proportion of dysprosium was altered, as shown in Table 3.

TABLE 3

| Sample | Material Mixing Ratio | | | |
|---|---|---|---|---|
| | Strontium carbonate | Europium | | Dysprosium |
| Sample 2-(2) | 0.98998 mol | 1.1 mol | 0.005 mol | 0.00001 mol |
| (3) | 0.9899 | 1.0 | 0.005 | 0.00005 |
| (4) | 0.985 | 1.0 | 0.005 | 0.0025 |
| (5) | 0.94 | 1.0 | 0.005 | 0.025 |
| (6) | 0.92 | 1.0 | 0.005 | 0.035 |
| (7) | 0.79 | 1.0 | 0.005 | 0.10 |

The results of the examination of the afterglow characteristics of these samples 2-(2) through 2-(7), together with those of sample 2-(1), are shown in Table 4.

It can be seen from Table 4 that, considering that $SrAl_2O_4$:Eu, Dy phosphorescent phosphor has a more excellent afterglow characteristic and more excellent luminance 10 minutes after excitation than ZnS:Cu phosphorescent phosphor, the optimum proportion of Dy, served as the co-activator, is between 0.0025 mol and 0.05 mol. However, even when the proportion of Dy is 0.00001 mol, afterglow of $SrAl_2O_4$:Eu, Dy Phosphorescent phosphor has a higher luminance than that of ZnS:Cu Phosphorescent phosphor 30 minutes after excitation ceases. This fact indicates the effects of added Eu and Dy as an activator and a co-activator, respectively. Further, since Dy is expensive, if economy and deterioration in the afterglow characteristics due to concentration quenching are taken into consideration, addition of Dy at a proportion of 0.1 mol (10 mol %) or above is meaningless.

Further, since $SrAl_2O_4$:Eu, Dy Phosphorescent phosphor is an oxide, it is chemically stable and shows excellent Photo-resistance when compared with conventional sulfide Phosphorescent phosphors (see Tables 24, 25).

TABLE 4

| Sample | Luminance 10 minutes after | Luminance 30 minutes after | Luminance 100 minutes after |
|---|---|---|---|
| ZnS: Cu Std | 1.00 | 1.00 | 1.00 |
| Sample 2-(1) | 12.5 | 19.6 | 37.0 |
| Sample 2-(2) | 0.943 | 1.57 | 2.00 |
| Sample 2-(3) | 1.5 | 1.7 | 2.1 |
| Sample 2-(4) | 11.7 | 17.3 | 22.1 |
| Sample 2-(5) | 20.4 | 28.8 | 40.2 |
| Sample 2-(6) | 18.6 | 26.3 | 36.4 |
| Sample 2-(7) | 1.95 | 2.66 | 3.30 |

Next, a phosphorescent phosphor which employs strontium as the metal element (M) and which employs europium as an activator and neodymium as a co-activator will be described as example 3.

EXAMPLE 3

Synthesis of $SrAl_2O_4$:Eu, Nd phosphorescent phosphor and characteristics thereof Samples 3-(1) through 3-(7)

$SrAl_2O_4$:Eu, Nd phosphorescent phosphor samples having compositions shown in Table 5 were manufactured in the same manner as that described above with the exception that the proportion of neodymium was altered, as shown in Table 5.

TABLE 5

| Sample | Material Mixing Ratio | | | |
|---|---|---|---|---|
| | Strontium carbonate | Alumina | Europium | Neodymium |
| Sample 3-(1) | 0.98998 mol | 1.0 mol | 0.005 mol | 0.00001 mol |
| (2) | 0.9899 | 1.0 | 0.005 | 0.00005 |
| (3) | 0.985 | 1.0 | 0.005 | 0.0025 |
| (4) | 0.980 | 1.0 | 0.005 | 0.005 |
| (5) | 0.94 | 1.0 | 0.005 | 0.025 |
| (6) | 0.92 | 1.0 | 0.005 | 0.035 |
| (7) | 0.79 | 1.0 | 0.005 | 0.10 |

The results of the examination of the afterglow characteristics of these samples 3-(1) through 3-(7) are shown in Table 6.

TABLE 6

| Sample | Luminance 10 minutes after | Luminance 30 minutes after | Luminance 100 minutes after |
|---|---|---|---|
| ZnS:Cu Std. | 1.00 | 1.00 | 1.00 |
| Sample 3-(1) | 0.71 | 0.91 | 1.12 |
| (2) | 0.73 | 1.02 | 1.25 |
| (3) | 6.20 | 8.50 | 11.14 |
| (4) | 9.05 | 11.75 | 14.29 |
| (5) | 9.01 | 11.55 | 13.98 |
| (6) | 8.50 | 10.21 | 11.96 |
| (7) | 2.35 | 2.54 | 2.86 |

It can be seen from Table 6 that when the amount of added Nd as a co-activator is between 0.025 and 0.10 mol, $SrAl_2O_4$:Eu, Nd phosphorescent phosphor has a more excellent afterglow characteristic and a higher luminance 10 minutes after excitation than ZnS:Cu phosphorescent phosphor. However, even when the proportion of Nd is 0.00001 mol, afterglow of $SrAl_2O_4$:Eu, Nd phosphorescent phosphor has a higher luminance than that of ZnS:Cu phosphorescent phosphor 60 minutes after excitation ceases. This fact indicates the effects of added Eu and Nd as an activator and a co-activator, respectively. Further, since Nd is expensive, if economy and deterioration in the afterglow characteristics due to concentration quenching are taken into consideration, addition of Nd at a proportion of 0.1 mol (10 mol %) or above is meaningless.

Further, since $SrAl_2O_4$:Eu, Nd phosphorescent phosphor is an oxide, it is chemically stable and shows excellent photo-resistance when compared with conventional sulfide phosphorescent phosphors (see Tables 24, 25).

Figure 7:
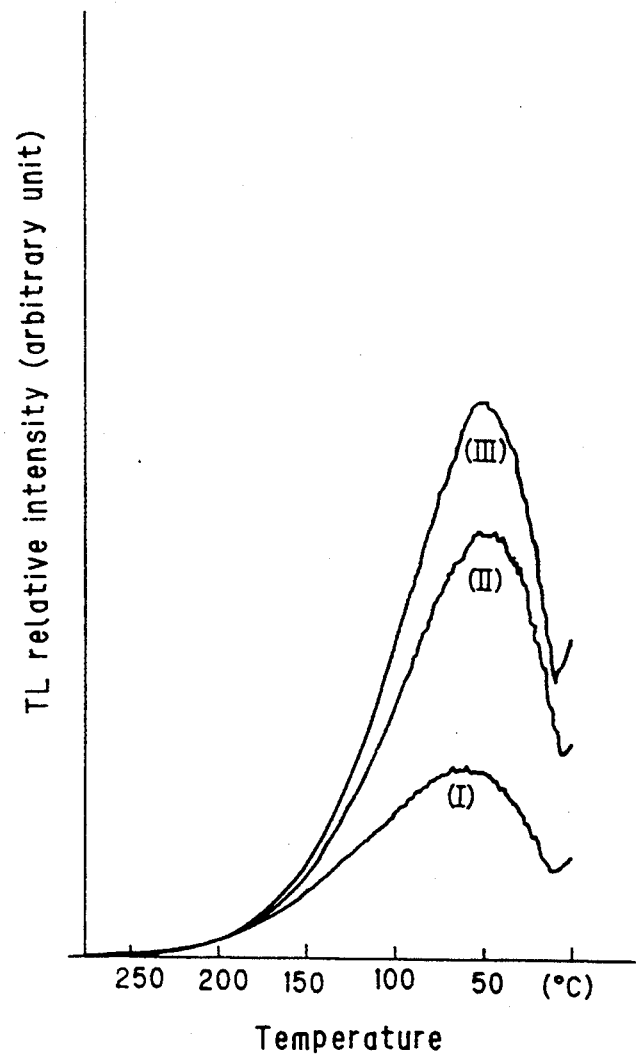
FIG. 7 is a graph showing the thermo-luminescence characteristics of $SrAl_2O_4$:Eu, Nd phosphorescent phosphor.

FIG. 7 shows the results of the examination of the thermo-luminescence characteristics (glow curves) of $SrAl_2O_4$:Eu, Nd phosphorescent phosphor sample 3-(4) previously irradiated which was conducted in a temperature range between the room temperature and 250° C. It can be seen from FIG. 7 that the main peak temperature of thermo-luminescence of the phosphorescent phosphor in which Nd is doped as a co-activator is about 50° C.

Next, a phosphorescent phosphor which employs strontium as the metal element (M), which employs europium as an activator and, which employs, as a co-activator, one element selected from a group consisting of lanthanum, cerium, praseodymium, samarium, gadolinium, terbium, holmium, erbium, thulium, ytterbium, lutetium, manganese, tin, bismuth will be described as example 4.

In the case of europium, neodymium or dysprosium as an activator or a co-activator, addition thereof at a proportion of 0.005 mol relative to the metal element (M) assured the high afterglow luminance. With this fact taken into consideration, only the samples in which the Eu concentration of the activator is 0.5 mol % (0.005 mol) and the concentration of the co-activator is 0.5 mol % (0.005 mol) are shown.

EXAMPLE 4

Advantage of doping of another co-activator to $SrAl_2O_4$:Eu phosphorescent phosphor Table 7 shows the results of the examination of the afterglow characteristics of the phosphorescent phosphor samples to which lanthanum, cerium, praseodymium, samarium, gadolinium, terbium, holmium, erbium, thulium, ytterbium, lutetium, manganese, tin and bismuth were added, respectively, as the co-activator.

As can be seen from Table 7, the afterglow characteristics of any of $SrAl_2O_4$:Eu phosphorescent phosphors doped with co-activators, improved as the time of more than 30 or 100 minutes elapsed after cessation of excitation, as compared with those of currently available ZnS:Cu phosphorescent phosphor which was used as the comparison, and were thus at a level which allowed the phosphorescent phosphor to be put into practical use.

Since $SrAl_2O_4$:Eu phosphorescent phosphor is an oxide, it is chemically stable and shows excellent photo-resistance when compared with conventional sulfide phosphorescent phosphors (see Tables 24, 25).

TABLE 7

| Sample | Luminance 10 minutes after | Luminance 30 minutes after | Luminance 100 minutes after |
|---|---|---|---|
| Zns:Cu Std | 1.00 | 1.00 | 1.00 |
| $SrAl_2O_4$:Eu, La | 0.33 | 0.74 | 1.14 |
| $SrAl_2O_4$:Eu, Ce | 0.46 | 0.93 | 1.35 |
| $SrAl_2O_4$:Eu, Pr | 1.24 | 2.63 | 7.51 |
| $SrAl_2O_4$:Eu, Sm | 3.40 | 4.82 | 9.0 |
| $SrAl_2O_4$:Eu, Gd | 0.51 | 1.30 | 2.27 |
| $SrAl_2O_4$:Eu, Tb | 1.46 | 2.81 | 7.54 |
| $SrAl_2O_4$:Eu, Ho | 1.06 | 2.09 | 6.29 |
| $SrAl_2O_4$:Eu, Er | 0.63 | 1.43 | 3.18 |
| $SrAl_2O_4$:Eu, Tm | 0.81 | 1.53 | 3.28 |

TABLE 7-continued

| Sample | Luminance 10 minutes after | Luminance 30 minutes after | Luminance 100 minutes after |
|---|---|---|---|
| $SrAl_2O_4$:Eu, Yb | 0.61 | 1.28 | 2.99 |
| $SrAl_2O_4$:Eu, Lu | 0.49 | 1.01 | 3.40 |
| $SrAl_2O_4$:Eu, Mn | 0.81 | 1.86 | 5.57 |
| $SrAl_2O_4$:Eu, Sn | 1.93 | 3.61 | 7.92 |
| $SrAl_2O_4$:Eu, Bi | 0.72 | 1.77 | 5.55 |

Next, a phosphorescent phosphor, which employs calcium as the metal element (M), which employs europium as an activator and which employs no co-activator, and a phosphorescent phosphor which employs calcium as the metal element, which employs europium as an activator and which employs, as a co-activator, at least one element selected from a group consisting of lanthanum, cerium, praseodymium, neodymium, samarium, gadolinium, terbium, dysprosium, holmium, erbium, thulium, ytterbium, lutetium, manganese, tin and bismuth will be described below as example 5.

EXAMPLE 5

Synthesis of $CaAl_2O_4$:Eu phosphorescent phosphor and characteristics thereof

Europium oxide ($Eu_2O_3$) as an activator was doped to calcium carbonate having reagent grade and alumina having reagent grade and 5 g (0.08 mol) of boric acid was doped thereto as flux.

Europium oxide ($Eu_2O_3$) and either of lanthanum oxide, cerium oxide, praseodymium oxide, neodymium oxide, samarium oxide, gadolinium oxide, terbium oxide, dysprosium oxide, holmium oxide, erbium oxide, thulium oxide, ytterbium oxide, lutetium oxide, manganese oxide, tin oxide and bismuth oxide were added, as an activator and a co-activator respectively, to calcium carbonate having reagent grade and alumina having reagent grade and 5 g (0.08 mol) of boric acid was added thereto as flux. After the resultant mixture was sufficiently mixed using a ball mill, the sample was fired for 1 hour at 1300° C. in a stream of nitrogen-hydrogen mixture gas (97:3) (flow rate:0.1 liter/min) using an electric furnace. Thereafter, the sample was cooled to a room temperature for about 1 hour. The obtained powder compound was sieved having 100 mesh to obtain phosphorescent phosphor sample 5-(1) through 5-(42).

FIG. 8 shows the results of analysis of the crystal structure of the obtained sample 5-(2) by XRD. It was discovered from the diffraction peak characteristics that the obtained phosphorescent phosphor was monoclinic $CaAl_2O_4$.

Figure 9B:
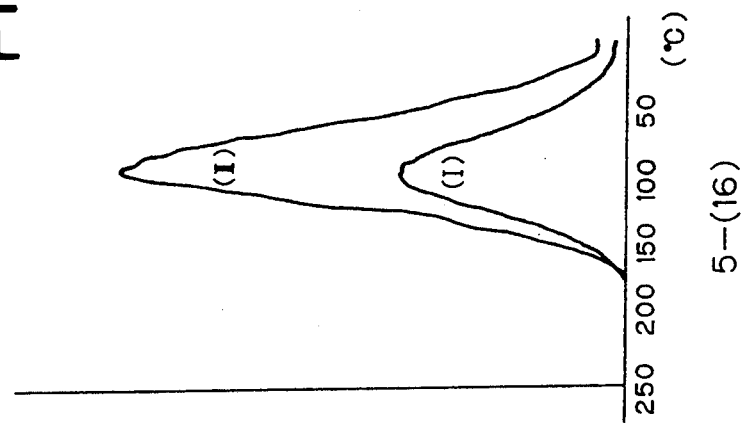
FIG. 9 is a graph showing the thermo-luminescence characteristics of $CaAl_2O_4$:Eu, phosphorescent phosphor which employs neodymium or samarium as the co-activator.
Figure 9A:
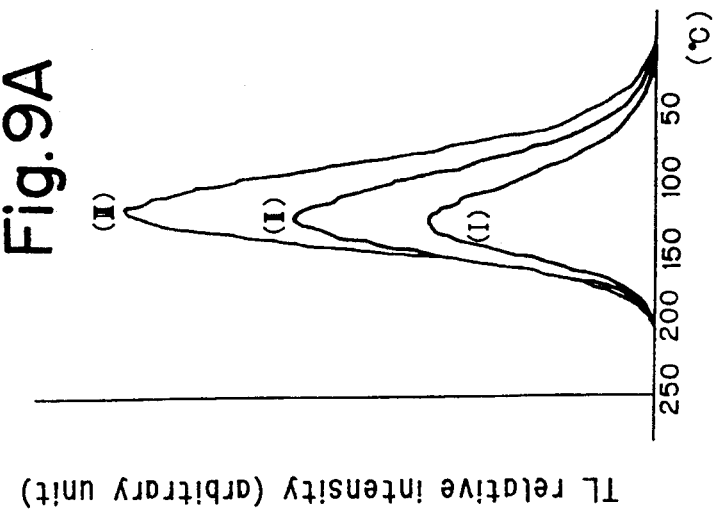
Figure 10A:
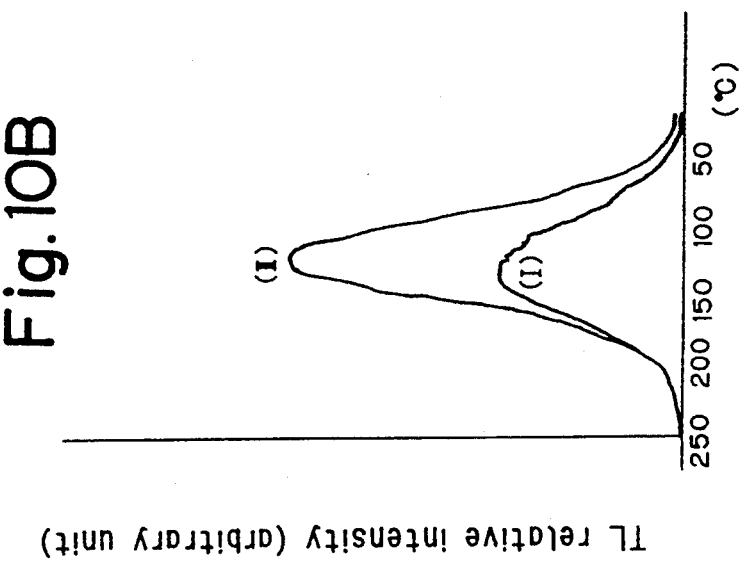
FIG. 10 is a graph showing the thermo-luminescence characteristics of $CaAl_2O_4$:Eu phosphorescent phosphor which employs dysprosium or thorium as the co-activator.
Figure 10B:
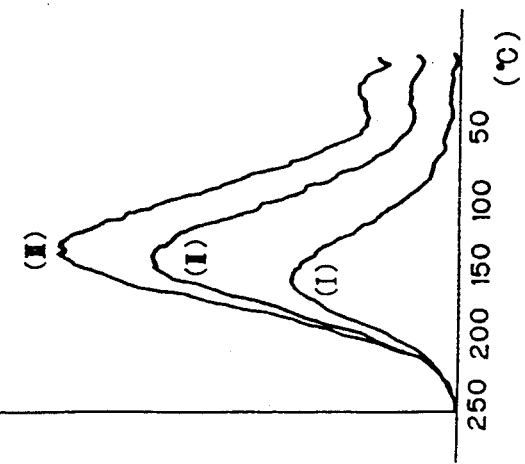
Figure 11:
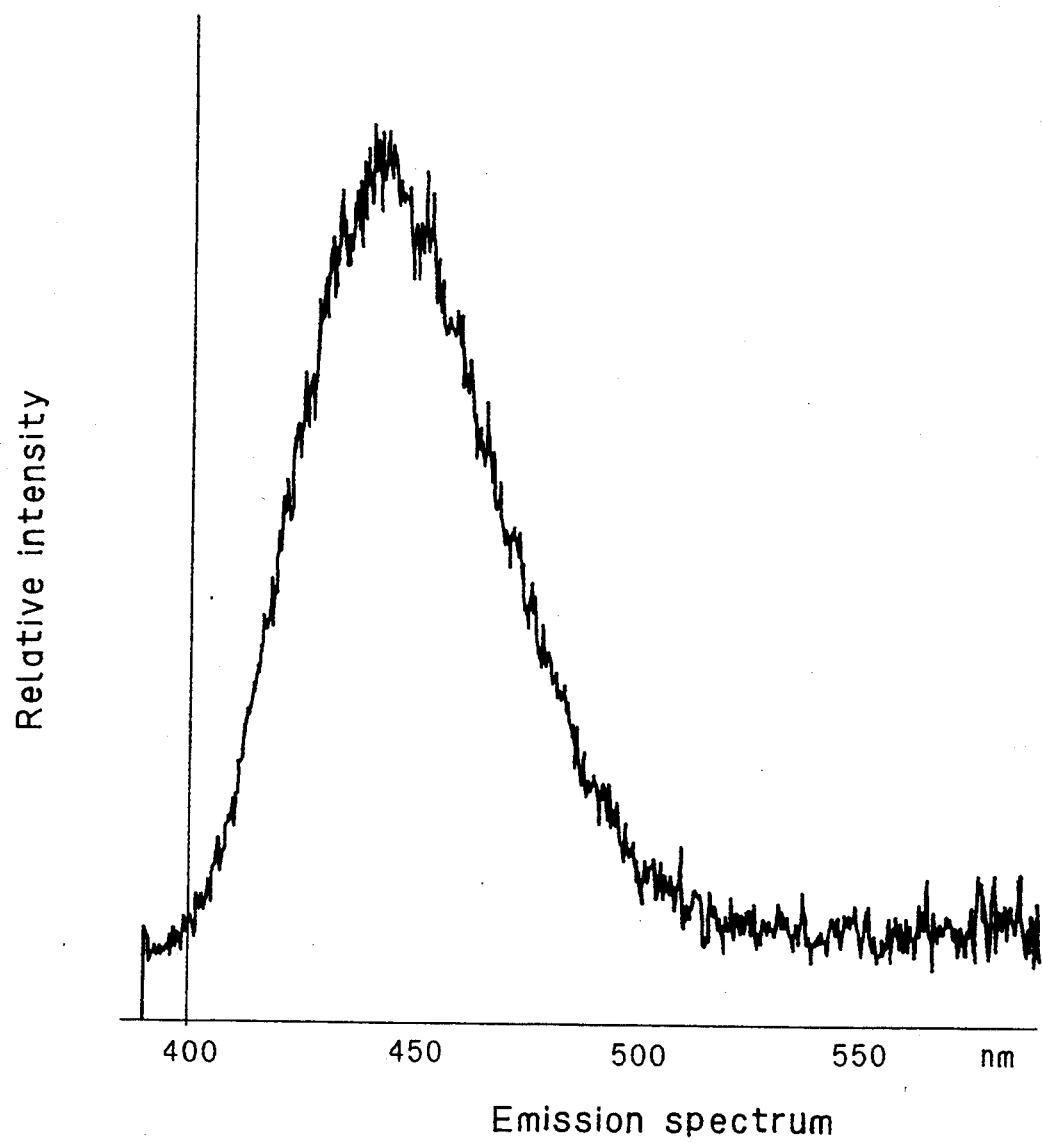
FIG. 11 is a graph showing the emission spectrum of $CaAl_2O_4$:Eu phosphorescent phosphor obtained 5 minutes after cessation of excitation.

FIGS. 9 and 10 show the results of the examination of the thermo-luminescence characteristics (glow curves) of samples 5-(10), 5-(16), 5-(22) and 5-(28) which employed, as the co-activator, neodymium, samarium, dysprosium, and thulium, respectively. In either case, the glow curve has a peak in the high-temperature range of 50° C. or above. This implies that these phosphorescent phosphors have longlasting afterglow characteristics. The emission spectrum of afterglow of each of the samples had a peak at about 442 nm, as shown in FIG. 11, and the color of afterglow was thus blue.

The afterglow characteristics of each of the samples were relatively compared with the afterglow characteristics of currently available CaSrS: Bi phosphorescent phosphor which emitted light of blue (manufactured by Nemoto Co., LTD trademark: BA-S, and the wavelength of emission peak:454 nm) in Tables 8 through 13.

As is apparent from Table 8, when the proportion of Eu in CaAl$_2$O$_4$:Eu phosphorescent phosphor is 0.005 mol (0.5 mol %), although the luminance of afterglow at an initial stage thereof is low, it increases substantially to that of the currently available phosphorescent phosphor 100 minutes after cessation of excitation. As shown in Tables 9 through 13, addition of a co-activator further increased the afterglow luminance. This happened whichever type of co-activator was employed. Particularly, addition of Nd, Sm and Tm was greatly effective, and thus provided a super high luminance blue emission color phosphorescent phosphor which was an order of magnitude brighter. FIG. 12 shows the results of the examination of the long-lasting afterglow of these high-luminance phosphorescent phosphors obtained by adding Nd, Sm and Tm as a co-activator.

In more detail, Table 8 shows the afterglow characteristics of phosphorescent phosphors which employ calcium and europium as the metal element (M) and the activator, respectively, and which employ no co-activator, the phosphorescent phosphors being shown in 5-(1) through 5-(6).

TABLE 8

| Sample | Luminance 10 minutes after | Luminance 30 minutes after | Luminance 100 minutes after |
|---|---|---|---|
| Std. CaSrS:Bi | 1.00 | 1.00 | 1.00 |
| 5-(1) CaAl$_2$O$_4$:Eu (Eu: 0.001 mol %) | 0.18 | 0.16 | 0.14 |
| 5-(2) CaAl$_2$O$_4$:Eu (Eu: 0.01 mol %) | 0.21 | 0.18 | 0.17 |
| 5-(3) CaAl$_2$O$_4$:Eu (Eu: 0.1 mol %) | 0.25 | 0.27 | 0.35 |
| 5-(4) CaAl$_2$O$_4$:Eu (Eu: 0.5 mol %) | 0.41 | 0.60 | 0.90 |
| 5-(5) CaAl$_2$O$_4$:Eu (Eu: 2.5 mol %) | 0.37 | 0.45 | 0.65 |
| 5-(6) CaAl$_2$O$_4$:Eu (Eu: 10 mol %) | 0.25 | 0.28 | 0.39 |

Table 9 shows the afterglow characteristics of phosphorescent phosphors which employ calcium, europium and neodymium as the metal element (M), the activator, and the co-activator, respectively, the phosphorescent phosphors being shown in 5-(7) through 5-(12).

TABLE 9

| Sample | Luminance 10 minutes after | Luminance 30 minutes after | Luminance 100 minutes after |
|---|---|---|---|
| Std. CaSrS:Bi | 1.00 | 1.00 | 1.00 |
| 5-(7) CaAl$_2$O$_4$:Eu, Nd (Eu: 0.5 mol % Nd: 0.001 mol %) | 0.53 | 0.78 | 1.01 |
| 5-(8) CaAl$_2$O$_4$:Eu, Nd (Eu: 0.5 mol % Nd: 0.01 mol %) | 1.05 | 1.53 | 2.60 |
| 5-(9) CaAl$_2$O$_4$:Eu, Nd (Eu: 0.5 mol % Nd: 0.1 mol %) | 8.68 | 11.8 | 20.3 |
| 5-(10) CaAl$_2$O$_4$:Eu, Nd (Eu: 0.5 mol % Nd: 0.5 mol %) | 9.87 | 14.0 | 25.0 |
| 5-(11) CaAl$_2$O$_4$:Eu, Nd (Eu: 0.5 mol % Nd: 2.5 mol %) | 3.18 | 4.51 | 8.05 |
| 5-(12) CaAl$_2$O$_4$:Eu, Nd (Eu: 0.5 mol % Nd: 10 mol %) | 0.84 | 1.18 | 2.02 |

Table 10 shows the afterglow characteristics of phosphorescent phosphors which employ calcium, curopium and samarium as the metal element (M), the activator, and the co-activator, respectively, the phosphorescent phosphors being shown in 5-(13) through 5-(18).

TABLE 10

| Sample | Luminance 10 minutes after | Luminance 30 minutes after | Luminance 100 minutes after |
|---|---|---|---|
| Std. CaSrS:Bi | 1.00 | 1.00 | 1.00 |
| 5-(13) CaAl$_2$O$_4$:Eu, Sm (Eu: 0.5 mol % Sm: 0.001 mol %) | 0.71 | 0.98 | 1.23 |
| 5-(14) CaAl$_2$O$_4$:Eu, Sm (Eu: 0.5 mol % Sm: 0.01 mol %) | 0.94 | 1.43 | 2.55 |
| 5-(15) CaAl$_2$O$_4$:Eu, Sm (Eu: 0.5 mol % Sm: 0.1 mol %) | 4.21 | 6.32 | 11.30 |
| 5-(16) CaAl$_2$O$_4$:Eu, Sm (Eu: 0.5 mol % Sm: 0.5 mol %) | 4.61 | 7.00 | 12.5 |
| 5-(17) CaAl$_2$O$_4$:Eu, Sm (Eu: 0.5 mol % Sm: 2.5 mol %) | 2.14 | 3.25 | 5.80 |
| 5-(18) CaAl$_2$O$_4$:Eu, Sm (Eu: 0.5 mol % Sm: 10 mol %) | 0.63 | 0.96 | 1.71 |

Table 11 shows the afterglow characteristics of phosphorescent phosphors which employ calcium, europium and dysprosium as the metal element (M), the activator, and the co-activator, respectively, the phosphorescent phosphors being shown in 5-(19) through 5-(24).

TABLE 11

| Sample | Luminance 10 minutes after | Luminance 30 minutes after | Luminance 100 minutes after |
|---|---|---|---|
| Std. CaSrS:Bi | 1.00 | 1.00 | 1.00 |
| 5-(19) CaAl$_2$O$_4$:Eu, Dy (Eu: 0.5 mol % Dy: 0.001 mol %) | 0.30 | 0.24 | 0.20 |
| 5-(20) CaAl$_2$O$_4$:Eu, Dy (Eu: 0.5 mol % Dy: 0.01 mol %) | 0.41 | 0.39 | 0.35 |
| 5-(21) CaAl$_2$O$_4$:Eu, Dy (Eu: 0.5 mol % Dy: 0.1 mol %) | 0.52 | 0.60 | 0.76 |
| 5-(22) CaAl$_2$O$_4$:Eu, Dy (Eu: 0.5 mol % Dy: 0.5 mol %) | 0.76 | 0.90 | 1.25 |
| 5-(23) CaAl$_2$O$_4$:Eu, Dy (Eu: 0.5 mol % Dy: 2.5 mol %) | 0.84 | 1.18 | 1.76 |
| 5-(24) CaAl$_2$O$_4$:Eu, Dy (Eu: 0.5 mol % Dy: 10 mol %) | 0.50 | 0.58 | 0.76 |

Table 12 shows the afterglow characteristics of phosphorescent phosphors which employ calcium, europium and thulium as the metal element (M), the activator, and the co-activator, respectively, the phosphorescent phosphors being shown in 5-(25) through 5-(30).

TABLE 12

| Sample | Luminance 10 minutes after | Luminance 30 minutes after | Luminance 100 minutes after |
|---|---|---|---|
| Std. CaSrS:Bi | 1.00 | 1.00 | 1.00 |
| 5-(25) CaAl$_2$O$_4$:Eu, Tm (Eu: 0.5 mol % Dy: 0.001 mol %) | 1.04 | 1.36 | 1.81 |
| 5-(26) CaAl$_2$O$_4$:Eu, Tm (Eu: 0.5 mol % Tm: 0.01 mol %) | 2.09 | 2.65 | 3.75 |

TABLE 12-continued

| Sample | Luminance 10 minutes after | Luminance 30 minutes after | Luminance 100 minutes after |
|---|---|---|---|
| 5-(27) CaAl$_2$O$_4$:Eu, Tm (Eu: 0.5 mol % Tm: 0.1 mol %) | 4.89 | 5.78 | 8.70 |
| 5-(28) CaAl$_2$O$_4$:Eu, Tm (Eu: 0.5 mol % Tm: 0.5 mol %) | 6.55 | 9.04 | 18.6 |
| 5-(29) CaAl$_2$O$_4$:Eu, Tm (Eu: 0.5 mol % Tm: 2.5 mol %) | 0.634 | 1.19 | 2.68 |
| 5-(30) CaAl$_2$O$_4$:Eu, Tm (Eu: 0.5 mol % Tm: 10 mol %) | 0.151 | 0.358 | 0.755 |

Table 13 shows the afterglow characteristics of phosphorescent phosphors which employ calcium, europium and either of lanthanum, cerium, paraseodymium, gadolinium, terbium, holmium, erbium, ytterbium, lutetium, manganese, tin and bismuth as the metal element (M), the activator, and the co-activator, respectively, the phosphorescent phosphors being shown in 5-(31) through 5-(42).

0.5 mol % of europium as the activator and another co-activator were each doped to the phosphorescent phosphors shown in 5-(31) through 5-(42).

TABLE 13

| Sample | Luminance 10 minutes after | Luminance 30 minutes after | Luminance 100 minutes after |
|---|---|---|---|
| Std. CaSrS:Bi | 1.00 | 1.00 | 1.00 |
| (31) CaAl$_2$O$_4$:Eu, La (Eu: 0.5 mol % La: 0.5 mol %) | 0.52 | 0.67 | 0.81 |
| (32) CaAl$_2$O$_4$:Eu, Ce (Eu: 0.5 mol % Ce: 0.5 mol %) | 0.84 | 1.23 | 1.96 |
| (33) CaAl$_2$O$_4$:Eu, Pr (Eu: 0.5 mol % Pr: 0.5 mol %) | 0.58 | 0.82 | 1.13 |
| (34) CaAl$_2$O$_4$:Eu, Gd (Eu: 0.5 mol % Gd: 0.5 mol %) | 0.66 | 0.91 | 1.26 |
| (35) CaAl$_2$O$_4$:Eu, Tb (Eu: 0.5 mol % Tb: 0.5 mol %) | 0.84 | 1.31 | 2.08 |
| (36) CaAl$_2$O$_4$:Eu, Ho (Eu: 0.5 mol % Ho: 0.5 mol %) | 0.98 | 1.33 | 2.39 |
| (37) CaAl$_2$O$_4$:Eu, Er (Eu: 0.5 mol % Er: 0.5 mol %) | 0.56 | 0.76 | 0.98 |
| (38) CaAl$_2$O$_4$:Eu, Yb (Eu: 0.5 mol % Yb: 0.5 mol %) | 0.70 | 0.91 | 1.28 |
| (39) CaAl$_2$O$_4$:Eu, Lu (Eu: 0.5 mol % Lu: 0.5 mol %) | 0.68 | 0.90 | 1.24 |
| (40) CaAl$_2$O$_4$:Eu, Mn (Eu: 0.5 mol % Mn: 0.5 mol %) | 0.31 | 0.42 | 0.58 |
| (41) CaAl$_2$O$_4$:Eu, Sn (Eu: 0.5 mol % Sn: 0.5 mol %) | 0.45 | 0.58 | 0.73 |
| (42) CaAl$_2$O$_4$:Eu, Bi (Eu: 0.5 mol % Bi: 0.5 mol %) | 0.25 | 0.33 | 0.48 |

Next, a phosphorescent phosphor which employs, calcium europium and neodymium as the metal element (M), the activator and the co-activator, respectively while another co-activator is added thereto at the same time will be described as example 6.

EXAMPLE 6

Synthesis of CaAl$_2$O$_4$:Eu, Nd phosphorescent phosphor and characteristics thereof Europium oxide (Eu$_2$O$_3$) as an activator and neodynrium as a co-activator were added to calcium carbonate having reagent grade and alumina having reagent grade and 5 g (0.08 mol) of boric acid was added thereto as flux.

Europium oxide (Eu$_2$O$_3$) as an activator, neodymium as a co-activator, and further, either of lanthanum oxide, cerium oxide, praseodymium oxide, samarium oxide, gadolinium oxide, terbium oxide, dysprosium oxide, holmium oxide, erbium oxide, thulium oxide, ytterbium oxide, lutetium oxide, manganese oxide, tin oxide and bismuth oxide except neodymium oxide as another co-activator were doped to calcium carbonate having reagent grade and alumina having reagent grade and 5 g (0.08 mol) of boric acid was added thereto as flux. After the resultant mixture was sufficiently mixed using a ball mill, the sample was fired for 1 hour at 1300° C. in a stream of nitrogen-hydrogen mixture gas (97:3) (flow rate:0.1 liter/min) using an electric furnace. Thereafter, the sample was cooled to a room temperature for about 1 hour. The obtained powder compound was sieved having 100 mesh to obtain phosphorescent phosphor sample 6-(1) through 6-(43).

Various samples were manufactured with 0.5 mol % of Eu, 0.5 mol % of Nd and 0.5 mol % of another co-activator and the afterglow luminances 10 minutes, 30 minutes and 100 minutes after excitation were measured. Table 14 shows the results in 6-(1) through 6-(15).

TABLE 14

| Sample | Luminance 10 minutes after | Luminance 30 minutes after | Luminance 100 minutes after |
|---|---|---|---|
| Std. CaSrS:Bi | 1.0 | 1.0 | 1.0 |
| CaAl$_2$O$_4$:Eu,Nd | 9.87 | 14.0 | 25.0 |
| 6-(1) CaAl$_2$O$_4$:Eu, Nd, La | 20.6 | 23.2 | 29.5 |
| (2) CaAl$_2$O$_4$:Eu, Nd, Ce | 12.7 | 17.5 | 26.9 |
| (3) CaAl$_2$O$_4$:Eu, Nd, Pr | 13.3 | 18.1 | 27.7 |
| (4) CaAl$_2$O$_4$:Eu, Nd, Sm | 8.20 | 12.6 | 22.6 |
| (5) CaAl$_2$O$_4$:Eu, Nd, Gd | 16.7 | 21.3 | 33.5 |
| (6) CaAl$_2$O$_4$:Eu, Nd, Tb | 13.8 | 17.2 | 25.5 |
| (7) CaAl$_2$O$_4$:Eu, Nd, Dy | 14.8 | 18.9 | 30.8 |
| (8) CaAl$_2$O$_4$:Eu, Nd, Ho | 16.5 | 21.6 | 34.3 |
| (9) CaAl$_2$O$_4$:Eu, Nd, Er | 15.9 | 21.0 | 33.8 |
| (10) CaAl$_2$O$_4$:Eu, Nd, Tm | 4.17 | 6.69 | 13.4 |
| (11) CaAl$_2$O$_4$:Eu, Nd, Yb | 11.0 | 16.9 | 27.9 |
| (12) CaAl$_2$O$_4$:Eu, Nd, Lu | 10.2 | 15.2 | 25.2 |
| (13) CaAl$_2$O$_4$:Eu, Nd, Mn | 6.45 | 8.01 | 11.9 |
| (14) CaAl$_2$O$_4$:Eu, Nd, Sn | 11.4 | 14.1 | 21.2 |
| (15) CaAl$_2$O$_4$:Eu, Nd, Bi | 10.6 | 13.5 | 21.4 |

It was recognized from the result of the measurement that the co-activators doped together with neodymium which have a particularly excellent afterglow luminance, were lanthanum, dysprosium, gadolinium, holmium, erbium and the like.

Then, with 0.5 mol % of Eu and 0.5 mol % of Nd, the concentration of lanthanum was changed from 0.1 mol % to 10 mol %. Table 15 shows the result of the experiment in 6-(16) through 6-(21).

TABLE 15

| Sample | Luminance 10 minutes after | Luminance 30 minutes after | Luminance 100 minutes after |
|---|---|---|---|
| Std. CaSrS:Bi | 1.0 | 1.0 | 1.0 |
| (16) CAl$_2$O$_4$:Eu, Nd (Eu: 0.5 mol % Nd: 0.5 mol %) | 9.87 | 14.0 | 25.0 |
| (17) CaAl$_2$O$_4$:Eu, Nd, La (Eu: 0.5 mol % Nd: 0.5 mol % La: 0.1 mol %) | 14.1 | 18.2 | 29.3 |
| (18) CaAl$_2$O$_4$:Eu, Nd, La (Eu: 0.5 mol % Nd: 0.5 mol % La: 0.3 mol %) | 15.5 | 18.9 | 28.5 |
| (1) CaAl$_2$O$_4$:Eu, Nd, La (Eu: 0.5 mol % Nd: 0.5 mol % La: 0.5 mol %) | 20.6 | 23.2 | 29.5 |

TABLE 15-continued

| Sample | Luminance 10 minutes after | Luminance 30 minutes after | Luminance 100 minutes after |
|---|---|---|---|
| (19) $CaAl_2O_4$:Eu, Nd, La (Eu: 0.5 mol % Nd: 0.5 mol % La: 1.0 mol %) | 1.42 | 1.05 | 0.858 |
| (20) $CaAl_2O_4$:Eu, Nd, La (Eu: 0.5 mol % Nd: 0.5 mol % La: 2.0 mol %) | Measurement Limit | | |
| (21) $CaAl_2O_4$:Eu, Nd, La (Eu: 0.5 mol % Nd: 0.5 mol % La: 10 mol %) | Measurement Limit | | |

With 0.5 mol % of Eu and 0.5 mol % of Nd, the concentration of dysprosium was changed from 0.1 mol % to 10 mol %. Table 16 shows the result of the experiment in 6-(22) through 6-(27).

TABLE 16

| Sample | Luminance 10 minutes after | Luminance 30 minutes after | Luminance 100 minutes after |
|---|---|---|---|
| Std. CaSrS:Bi | 1.0 | 1.0 | 1.0 |
| (22) $CaAl_2O_4$:Eu, Nd (Eu: 0.5 mol % Nd: 0.5 mol %) | 9.87 | 14.0 | 25.0 |
| (23) $CaAl_2O_4$:Eu, Nd, Dy (Eu: 0.5 mol % Nd: 0.5 mol % Dy: 0.1 mol %) | 4.32 | 6.76 | 12.0 |
| (24) $CaAl_2O_4$:Eu, Nd, Dy (Eu: 0.5 mol % Nd: 0.5 mol % Dy: 0.3 mol %) | 8.91 | 14.0 | 24.2 |
| (7) $CaAl_2O_4$:Eu, Nd, Dy (Eu: 0.5 mol % Nd: 0.5 mol % Dy: 0.5 mol %) | 14.8 | 18.9 | 30.8 |
| (25) $CaAl_2O_4$:Eu, Nd, Dy (Eu: 0.5 mol % Nd: 0.5 mol % Dy: 1.0 mol %) | 12.1 | 18.3 | 27.8 |
| (26) $CaAl_2O_4$:Eu, Nd, Dy (Eu: 0.5 mol % Nd: 0.5 mol % Dy: 2.0 mol %) | 7.49 | 10.3 | 16.0 |
| (27) $CaAl_2O_4$:Eu, Nd, Dy (Eu: 0.5 mol % Nd: 0.5 mol % Dy: 10 mol %) | 1.84 | 1.29 | 0.998 |

With 0.5 mol % of Eu and 0.5 mol % of Nd, the concentration of gadolinium was changed from 0.1 mol % to 10 mol %. Table 17 shows the result of the experiment in 6-(28) through 6-(32).

TABLE 17

| Sample | Luminance 10 minutes after | Luminance 30 minutes after | Luminance 100 minutes after |
|---|---|---|---|
| Std. CaSrS:Bi | 1.0 | 1.0 | 1.0 |
| $CaAl_2O_4$:Eu, Nd (Eu: 0.5 mol % Nd: 0.5 mol %) | 9.87 | 14.0 | 25.0 |
| (28) $CaAl_2O_4$:Eu, Nd, Gd (Eu: 0.5 mol % Nd: 0.5 mol % Gd: 0.1 mol %) | 11.8 | 17.4 | 30.0 |
| (29) $CaAl_2O_4$:Eu, Nd, Gd (Eu: 0.5 mol % Nd: 0.5 mol % Gd: 0.3 mol %) | 12.7 | 17.8 | 29.8 |
| (5) $CaAl_2O_4$:Eu, Nd, Gd (Eu: 0.5 mol % Nd: 0.5 mol % Gd: 0.5 mol %) | 16.7 | 21.3 | 33.5 |
| (30) $CaAl_2O_4$:Eu, Nd, Gd (Eu: 0.5 mol % Nd: 0.5 mol % Gd: 1.0 mol %) | 10.8 | 15.7 | 26.5 |
| (31) $CaAl_2O_4$:Eu, Nd, Gd (Eu: 0.5 mol % Nd: 0.5 mol % Gd: 2.0 mol %) | 18.0 | 21.7 | 29.5 |
| (32) $CaAl_2O_4$:Eu, Nd, Gd (Eu: 0.5 mol % Nd: 0.5 mol % Gd: 10 mol %) | 1.01 | 0.764 | 0.590 |

With 0.5 mol % of Eu and 0.5 mol % of Nd, the concentration of holmium was changed from 0.1 mol % to 10 mol %. Table 18 shows the result of the experiment in 6-(33) through 6-(37).

TABLE 18

| Sample | Luminance 10 minutes after | Luminance 30 minutes after | Luminance 100 minutes after |
|---|---|---|---|
| Std. CaSrS:Bi | 1.0 | 1.0 | 1.0 |
| $CaAl_2O_4$:Eu, Nd (Eu: 0.5 mol % Nd: 0.5 mol %) | 9.87 | 14.0 | 25.0 |
| (33) $CaAl_2O_4$:Eu, Nd, Ho (Eu: 0.5 mol % Nd: 0.5 mol % Ho: 0.1 mol %) | 10.4 | 14.4 | 25.3 |
| (34) $CaAl_2O_4$:Eu, Nd, Ho (Eu: 0.5 mol % Nd: 0.5 mol % Ho: 0.3 mol %) | 12.0 | 16.2 | 27.0 |
| (8) $CaAl_2O_4$:Eu, Nd, Ho (Eu: 0.5 mol % Nd: 0.5 mol % Ho: 0.5 mol %) | 16.5 | 21.6 | 34.3 |
| (35) $CaAl_2O_4$:Eu, Nd, Ho (Eu: 0.5 mol % Nd: 0.5 mol % Ho: 1.0 mol %) | 13.4 | 16.9 | 26.3 |
| (36) $CaAl_2O_4$:Eu, Nd, Ho (Eu: 0.5 mol % Nd: 0.5 mol % Ho: 2.0 mol %) | 13.3 | 16.0 | 23.5 |
| (37) $CaAl_2O_4$:Eu, Nd, Ho (Eu: 0.5 mol % Nd: 0.5 mol % Ho: 10 mol %) | 1.20 | 0.914 | 0.782 |

With 0.5 mol % of Eu and 0.5 mol % of Nd, the concentration of erbium was changed from 0.1 mol % to 5 mol %. Table 19 shows the result of the experiment in 6-(38) through 6-(43).

TABLE 19

| Sample | Luminance 10 minutes after | Luminance 30 minutes after | Luminance 100 minutes after |
|---|---|---|---|
| Std. CaSrS:Bi | 1.0 | 1.0 | 1.0 |
| $CaAl_2O_4$:Eu, Nd (Eu: 0.5 mol % Nd: 0.5 mol %) | 9.87 | 14.0 | 25.0 |
| (38) $CaAl_2O_4$:Eu, Nd, Er (Eu: 0.5 mol % Nd: 0.5 mol % Er: 0.1 mol %) | 10.7 | 15.1 | 27.0 |
| (39) $CaAl_2O_4$:Eu, Nd, Er (Eu: 0.5 mol % Nd: 0.5 mol % Er: 0.3 mol %) | 10.3 | 14.0 | 24.0 |
| (9) $CaAl_2O_4$:Eu, Nd, Er (Eu: 0.5 mol % Nd: 0.5 mol % Er: 0.5 mol %) | 15.9 | 21.0 | 33.8 |
| (40) $CaAl_2O_4$:Eu, Nd, Er (Eu: 0.5 mol % Nd: 0.5 mol % Er: 1.0 mol %) | 16.4 | 21.1 | 32.3 |
| (41) $CaAl_2O_4$:Eu, Nd, Er (Eu: 0.5 mol % Nd: 0.5 mol % Er: 2.0 mol %) | 17.3 | 21.7 | 30.8 |
| (42) $CaAl_2O_4$:Eu, Nd, Er (Eu: 0.5 mol % Nd: 0.5 mol % Er: 3.0 mol %) | 20.1 | 21.3 | 28.5 |
| (43) $CaAl_2O_4$:Eu, Nd, Er (Eu: 0.5 mol % Nd: 0.5 mol % Er: 5.0 mol %) | 17.5 | 17.8 | 22.0 |

It was recognized from the results of the measurements that certain mixtures of the co-activators improved the afterglow luminance. Further, it was also recognized that the sample had the most excellent afterglow characteristics when, with 0.5 mol % of Eu and 0.5 mol % of Nd, about 0.5 mol % of another co-activator was added.

Next, a phosphorescent phosphor which employs barium, europium and neodymium as the metal element (M), an activator and a co-activator, respectively, will be described as example 7.

EXAMPLE 7

$BaAl_2O_4$: Eu phosphorescent phosphor

After 0.5 mol % of Eu was added to the phosphorescent phosphor, further 0.5 mol % of Nd or Sm was added thereto. The results are shown in 7-(1) and 7-(2).

Figure 13A:
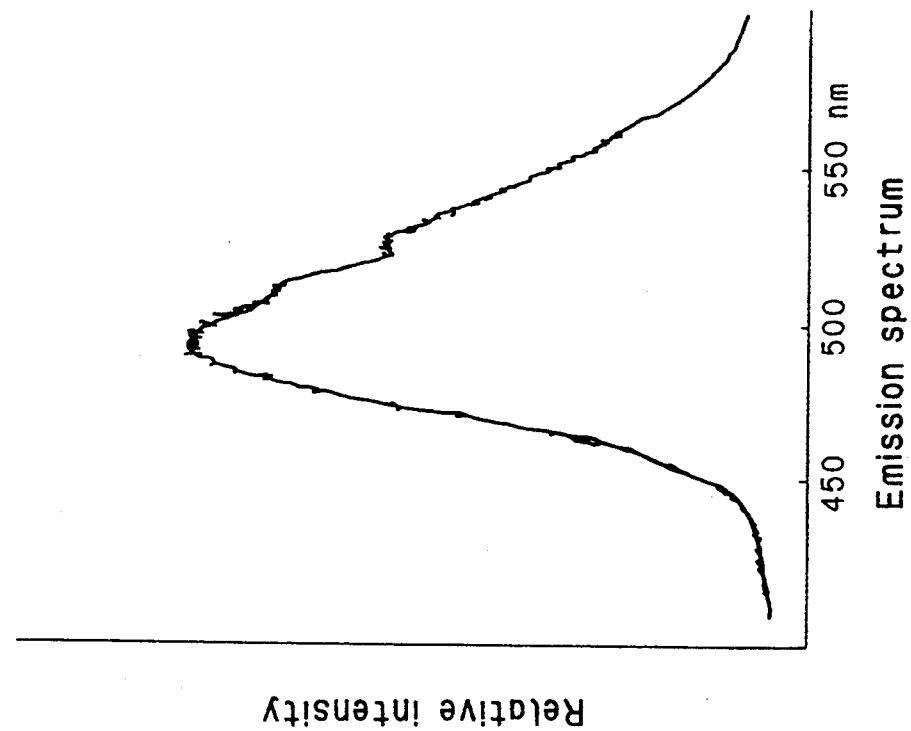
FIG. 13 is a graph showing the excitation spectrum of $BaAl_2O_4$:Eu, Nd phosphorescent phosphor and the emission spectrum thereof obtained 30 minutes after cessation of excitation.
Figure 13B:
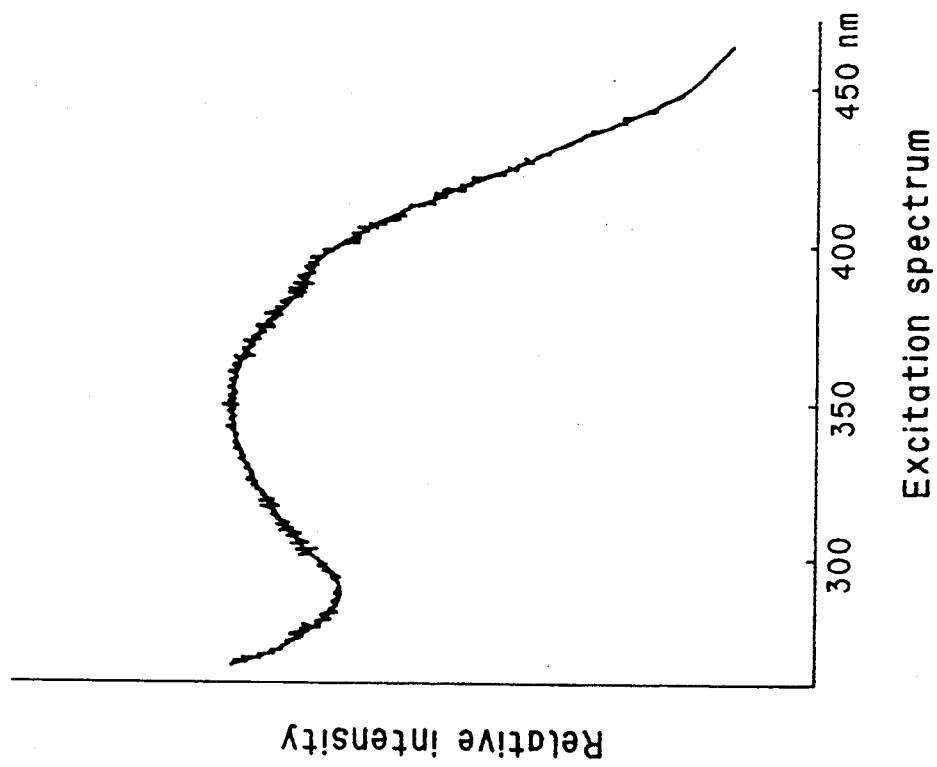

FIG. 13 shows the excitation spectrum of the phosphorescent phosphor which employs neodymium as the co-activator and the afterglow emission spectrum thereof obtained 30 minutes after excitation is ceased.

Figure 14A:
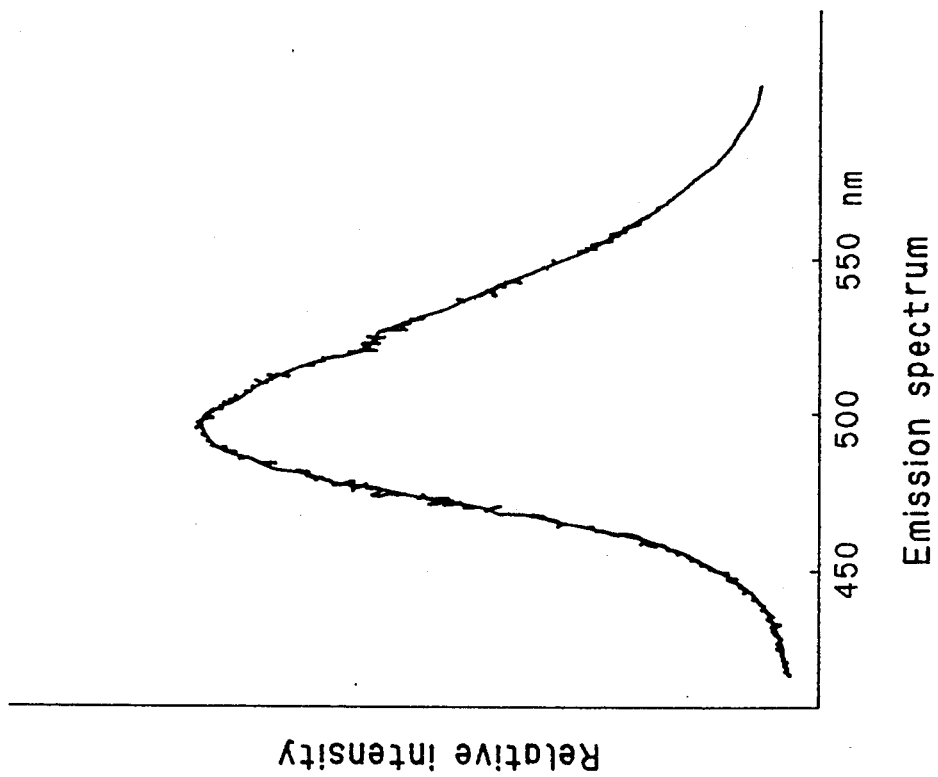
FIG. 14 is a graph showing the excitation spectrum of $BaAl_2O_4$:Eu, Sm phosphorescent phosphor and the emission spectrum thereof obtained 30 minutes after cessation of excitation.
Figure 14B:
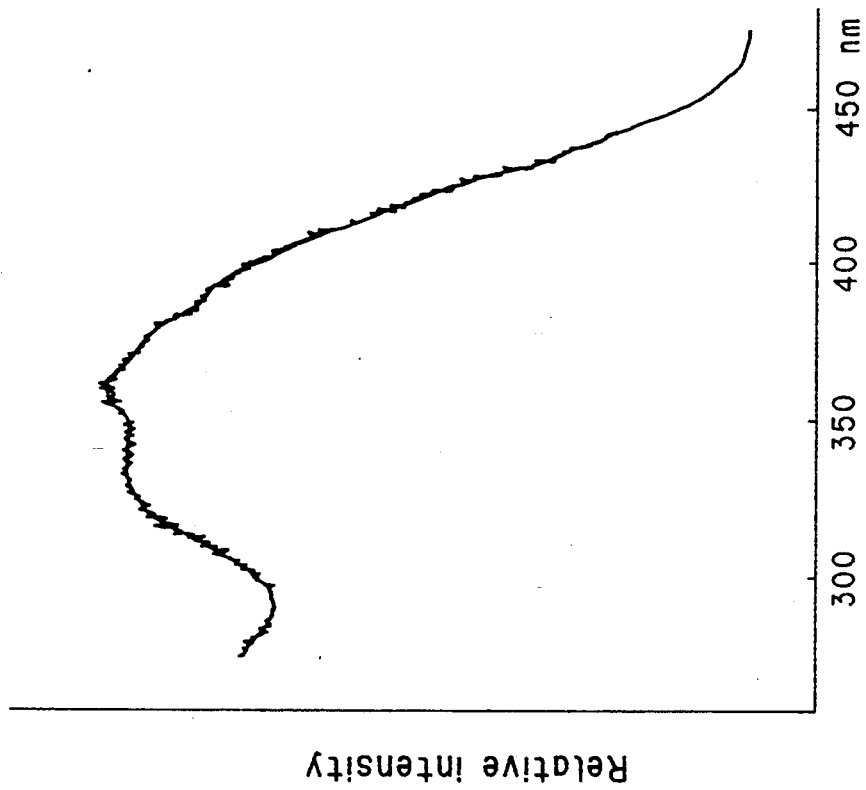

FIG. 14 shows the excitation spectrum of the phosphorescent phosphor which employs samarium as the co-activator and the afterglow emission spectrum thereof obtained 30 minutes after excitation is ceased.

The peak wavelength of emission spectrum is always about 500 nm, the emission spectrum emitting light of green. Table 20 shows the results of the comparison between the afterglow characteristics of the obtained $BaAl_2O_4$:Eu phosphorescent phosphor and those of ZnS:Cu phosphorescent phosphor which is available on the market and which emits light of green (manufactured by Nemoto & Co., LTD:GSS, and the wavelength of emission peak:530 nm), indicating relative values of the afterglow intensities 10 minutes, 30 minutes and 100 minutes after excitation is ceased.

TABLE 20

| Sample | Luminance 10 minutes after | Luminance 30 minutes after | Luminance 100 minutes after |
| --- | --- | --- | --- |
| Std. ZnS:Cu | 1.0 | 1.0 | 1.0 |
| $BaAl_2O_4$:Eu, Nd (Eu: 0.5 mol % Nd: 0.5 mol %) | 1.23 | 1.14 | 0.885 |
| $BaAl_2O_4$:Eu, Sm (Eu: 0.5 mol % Sm: 0.5 mol %) | 0.982 | 0.911 | 0.768 |

Table 20 shows that $BaAl_2O_4$:Eu, Nd has a more excellent afterglow luminance than ZnS:Cu phosphorescent phosphor for about 30 minutes after excitation is ceased. It was found that $BaAl_2O_4$:Eu, Sm had a little lower afterglow luminance than ZnS:Cu phosphorescent phosphor. However, it has been confirmed that no fluorescence or afterglow is recognized as a result of experiments with only $BaAl_2O_4$ crystal without adding Eu or other co-activator thereto. Therefore, it is evident that the effects of activation can be assured by doping Eu, Nd or Sm to $BaAl_2O_4$ phosphorescent phosphor.

Since $BaAl_2O_4$:Eu phosphorescent phosphor is an oxide, it is chemically stable and shows excellent photoresistance when compared with conventional sulfide phosphorescent phosphors (see Tables 24, 25).

Next, a phosphorescent phosphor which employs, as the metal element(M), a mixture of calcium and strontium will be described as example 8.

EXAMPLE 8

Synthesis of $SrXCa_{1-X}Al_2O_4$ phosphorescent phosphor and characteristics thereof Strontium carbonate having reagent grade and calcium carbonate having reagent grade were mixed with each other at different ratios. Alumina was added to each of the obtained samples. Also, europium and either of lanthanum, cerium, praseodymium, neodymium, samarium, gadolinium, terbium, dysprosium, holmium, erbium, thulium, ytterbium, lutetium, manganese, tin and bismuth were added to each of the samples as the activator and the co-activator, respectively, and additionally, 5 g (0.08 mol) of boric acid was added thereto as flux to obtain $SrXCa_{1-X}Al_2O_4$ phosphorescent phosphor samples in the manner described above.

Figure 15:
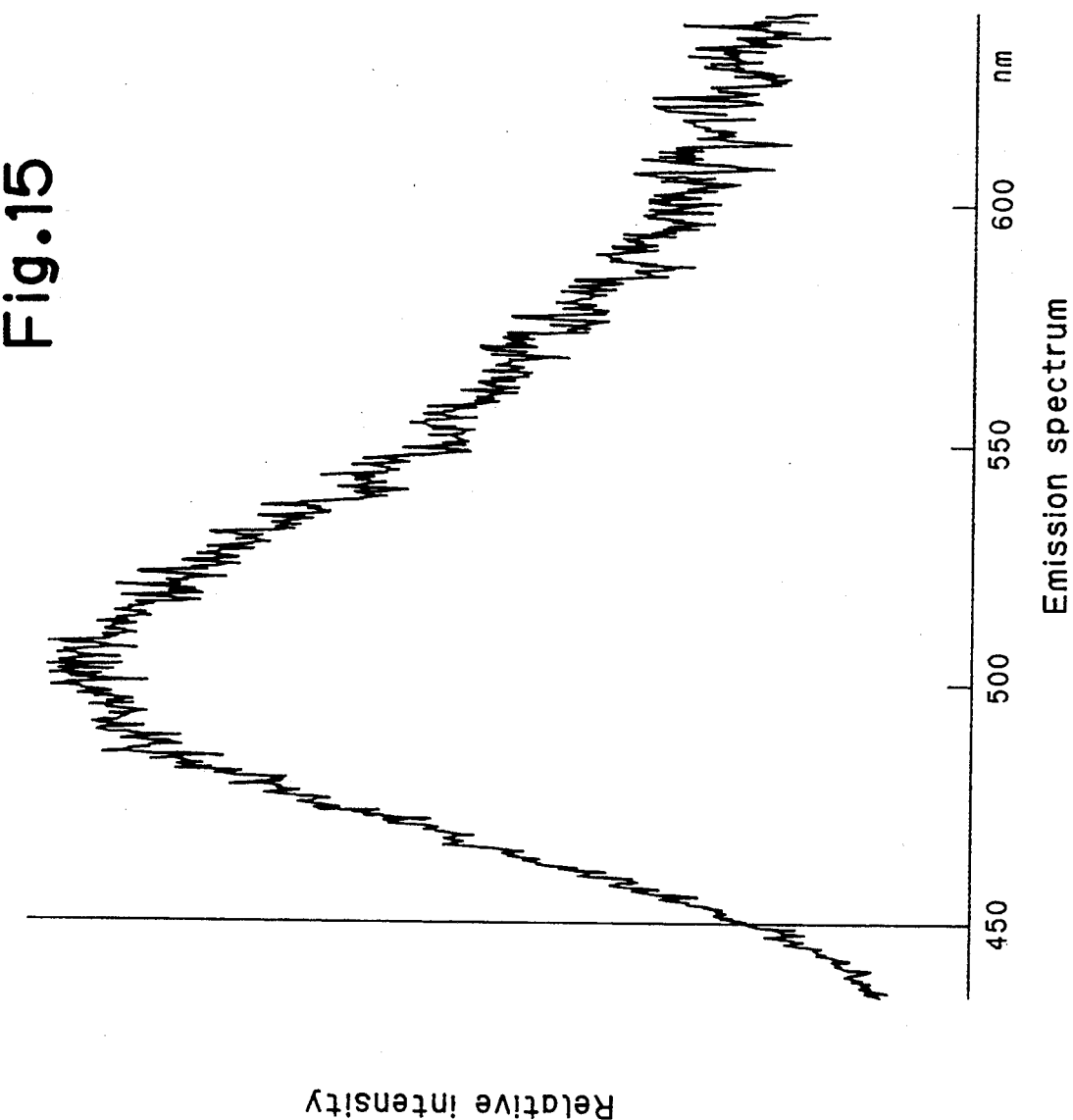
FIG. 15 is a graph showing the emission spectrum of $Sr0.5Ca0.5Al_2O_4$:Eu, Dy phosphorescent phosphor.

FIG. 15 shows the results of the examination of the afterglow emission spectrum of $Sr0.5Ca0.5Al_2O_4$:Eu, Dy phosphorescent phosphor (Eu 0.5 mol %, Dy 0.5 mol %). It is apparent from FIG. 15 that when Ca is substituted for a part of Sr, the emission wavelength is reduced and thus produces an afterglow having a color between that obtained by emission of $SrAl_2O_4$ phosphorescent phosphor and that obtained by emission of $CaAl_2O_4$ phosphorescent phosphor.

FIG. 16 shows the results of the examination of the afterglow characteristics of $SrxCa_{1-x}Al_2O_4$ phosphorescent phosphor samples in which 0.5 mol % of Eu and 0.5 mol % of Dy were added as the activator and the co-activator, respectively.

As can be seen from FIG. 16, any of these phosphorescent phosphors shows excellent afterglow characteristics and is thus practically applicable as compared with the currently available phosphorescent phosphors shown by the broken line in FIG. 16.

Next, a phosphorescent phosphor which employs, as the metal element (M), a mixture of strontium and barium will be described as example 9.

EXAMPLE 9

Synthesis of $SrXBa_{1-X}Al_2O_4$ phosphorescent phosphor and characteristics thereof Strontium carbonate having reagent grade and barium carbonate having reagent grade were mixed with each other at different ratios. Alumina was added to each of the obtained samples. Also, europium and either of lanthanum, cerium, praseodymium, neodymium, samarium, gadolinium, terbium, dysprosium, holmium, erbium, thulium, ytterbium, lutetium, manganese, tin and bismuth were added to each of the samples as the activator and the co-activator, respectively, and 5 g (0.08 mol) of boric acid was added thereto as flux to obtain SrXBa1-XAl2O4 phosphorescent phosphor samples in the manner described above.

FIG. 17 shows the results of the examination of the afterglow characteristics of $SrXBa_{1-X}Al_2O_4$ phosphorescent phosphors to which 0.5 mol % of Eu and 0.5 mol % of Dy were added.

As can be seen from FIG. 17, any of these phosphorescent phosphors shows excellent afterglow characteristics and is thus practically applicable as compared with the currently available phosphorescent phosphor shown by the broken line in FIG. 17.

Next, a phosphorescent phosphor which employs, as the metal element (M), a mixture of strontium and magnesium will be described as example 10.

EXAMPLE 10

Synthesis of SrXMg$_{1-x}$Al$_2$O$_4$ phosphorescent phosphor and characteristics thereof Strontium carbonate having reagent grade and magnesium carbonate having reagent grade were mixed with each other at different ratios. Alumina was added to each of the obtained samples. Also, europium and either of lanthanum, cerium, praseodymium, neodymium, samarium, gadolinium, terbium, dysprosium, holmium, erbium, thulium, ytterbium, lutetium, manganese, tin, and bismuth were added to each of the samples as the activator and the co-activator, respectively, and additionally, 5 g (0.08 mol) of boric acid was added thereto as flux to obtain SrXMg$_{1-x}$Al$_2$O$_4$ phosphorescent phosphor samples in the manner described above. FIG. 18 shows the results of the examination of the afterglow characteristics of SrXMg$_{1-x}$Al$_2$O$_4$ phosphorescent phosphors to which 0.5 mol % of Eu and 0.5 mol % of Dy were added.

As can be seen from FIG. 18, any of these phosphorescent phosphors shows excellent afterglow characteristics and is thus practically applicable except for the phosphorescent phosphors in which the ratio between strontium and magnesium was 0.1/0.9, as compared with the currently available phosphorescent phosphor shown by the broken line in FIG. 18.

Next, a phosphorescent phosphor which employs a plurality of metal elements and europium as the metal element (M) and an activator, respectively and further two types of co-activators, will be described as example 11.

EXAMPLE 11

Synthesis of Ca$_{1-x}$SrXAl$_2$O$_4$:Eu, Nd, X phosphorescent phosphor and characteristics thereof Strontium carbonate having reagent grade and calcium carbonate having reagent grade were mixed with each other at different ratios. Alumina was added to each of the obtained samples. Also, 0.5 mol % of europium, 0.5 mol % of neodymium and further, 0.5 mol % of either of lanthanum, dysprosium and holmium were added to each of the samples as the activator, the co-activator and another co-activator, respectively, and 5 g (0.08 mol) of boric acid was added thereto as flux to obtain Ca$_{1-x}$SrXAl$_2$O$_4$:Eu, Nd, X phosphorescent phosphor samples 11-(1) through 11-(9) in the manner described above. Then, the afterglow characteristics of the samples were examined.

Strontium carbonate having reagent grade and calcium carbonate having reagent grade were mixed with each other at different ratios. Alumina was added to each of the obtained samples. Also, 0.5 mol % of europium, 0.5 mol % of neodymium and further, 0.5 mol % of lanthanum were added to each of the samples as the activator, the co-activator and another co-activator, respectively, to obtain the samples 11-(1) through 11-(3) shown in Table 21.

TABLE 21

| Sample | Luminance 10 minutes after | Luminance 30 minutes after | Luminance 100 minutes after |
|---|---|---|---|
| Std. CaSrS:Bi | 1.0 | 1.0 | 1.0 |
| CaAl$_2$O$_4$:Eu, Nd | 9.87 | 14.0 | 25.0 |
| 11-(1) (Ca$_{0.9}$SR$_{0.1}$)Al$_2$O$_4$: Eu, Nd, La | 15.2 | 17.1 | 19.0 |

TABLE 21-continued

| Sample | Luminance 10 minutes after | Luminance 30 minutes after | Luminance 100 minutes after |
|---|---|---|---|
| (2) (Ca$_{0.7}$SR$_{0.3}$)Al$_2$O$_4$: Eu, Nd, La | 5.53 | 4.96 | 3.35 |
| (3) (Ca$_{0.5}$SR$_{0.5}$)Al$_2$O$_4$: Eu, Nd, La | 6.30 | 3.08 | Measurement limit |

Strontium carbonate having reagent grade and calcium carbonate having reagent grade were mixed with each other at different ratios. Alumina was added to each of the obtained samples. Also, 0.5 mol % of europium, 0.5 mol % of neodymium and further, 0.5 mol % of dysprosium were added to each of the samples as the activator, the co-activator and another co-activator, respectively, to obtain the samples 11-(4) through 11-(6) shown in Table 22.

TABLE 22

| Sample | Luminance 10 minutes after | Luminance 30 minutes after | Luminance 100 minutes after |
|---|---|---|---|
| Std. CaSrS:Bi | 1.0 | 1.0 | 1.0 |
| CaAl$_2$O$_4$:Eu, Nd | 9.87 | 14.0 | 25.0 |
| (4) (Ca$_{0.9}$Sr$_{0.1}$)Al$_2$O$_4$:Eu, Nd, Dy | 13.2 | 14.6 | 20.4 |
| (5) (Ca$_{0.7}$Sr$_{0.3}$)Al$_2$O$_4$:Eu, Nd, Dy | 8.00 | 7.46 | 9.05 |
| (6) (Ca$_{0.5}$Sr$_{0.5}$)Al$_2$O$_4$:Eu, Nd, Dy | 3.36 | 3.08 | Measurement limit |

Strontium carbonate having reagent grade and calcium carbonate having reagent grade were mixed with each other at different ratios. Alumina was added to each of the obtained samples. Also, 0.5 mol % of europium, 0.5 mol % of neodymium and further, 0.5 mol % of holmium were added to each of the samples as the activator, the co-activator and another co-activator, respectively, to obtain the samples 11-(7) through 11-(9) shown in Table 23.

TABLE 23

| Sample | Luminance 10 minutes after | Luminance 30 minutes after | Luminance 100 minutes after |
|---|---|---|---|
| Std. CaSrS:Bi | 1.0 | 1.0 | 1.0 |
| CaAl$_2$O$_4$:Eu, Nd | 9.87 | 14.0 | 25.0 |
| (7) (Ca$_{0.9}$Sr$_{0.1}$)Al$_2$O$_4$:Eu, Nd, Ho | 13.9 | 15.3 | 21.4 |
| (8) (Ca$_{0.7}$Sr$_{0.3}$)Al$_2$O$_4$:Eu, Nd, Ho | 8.25 | 7.81 | 9.95 |
| (9) (Ca$_{0.5}$Sr$_{0.5}$)Al$_2$O$_4$:Eu, Nd, Ho | 2.91 | 2.62 | 3.65 |

As can be seen from the results of the measurement, the phosphorescent phosphors which employ calcium and strontium as the metal element (M), employ europium as the activator and employ a plurality of co-activators shows excellent afterglow characteristics than CaSrS:Bi and further the luminance 10 minutes after excitation was more excellent than CaSrS:Bi.

EXAMPLE 12

Humidity test

Table 24 shows the results of the examination of moisture resistance characteristics of phosphorescent phosphor obtained according to the present invention.

In the humidity test, a plurality of phosphorescent phosphor samples were left for 500 hours in a constant temperature and humidity bath which was adjusted to 40° C. and 95%RH, and the resultant changes in the luminance of each of the samples were measured.

As can be seen from Table 24, none of the samples was affected by humidity and the samples were thus stable.

TABLE 24

| Sample | Before test | After test |
| --- | --- | --- |
| $SrAl_2O_4$:Eu, Dy (Eu: 0.5 mol % Dy: 0.5 mol %) | 1.0 | 1.01 |
| $CaAl_2O_4$:Eu, Nd (Eu: 0.5 mol % Nd: 0.5 mol %) | 1.0 | 0.99 |
| $Sr_{0.5}Ca_{0.5}Al_2O_4$:Eu, Dy (Eu: 0.5 mol % Dy: 0.5 mol %) | 1.0 | 1.00 |
| $Sr_{0.5}Ba_{0.5}Al_2O_4$:Eu, Dy (Eu: 0.5 mol % Dy: 0.5 mol %) | 1.0 | 0.99 |
| $Sr_{0.5}Mg_{0.5}Al_2O_4$:Eu, Dy (Eu: 0.5 mol % Dy: 0.5 mol %) | 1.0 | 1.02 |

EXAMPLE 13

Photo resistance test

FIG. 25 shows the results of the photo resistance test conducted on the phosphorescent phosphors according to the present invention together with the results obtained from zinc sulfide phosphorescent phosphor.

This test was conducted conforming to JIS standard on the sample placed in a transparent container whose humidity was adjusted to saturated humidity by irradiating the sample by a mercury lamp of 300 W located at 30 cm above the sample for 3 hours, 6 hours and 12 hours, respectively, and by measuring changes in the luminance caused by irradiation.

As can be seen from Table 25, phosphorescent phosphors according to the present invention are very stable as compared with conventional zinc sulfide phosphorescent phosphor.

TABLE 25

| Sample | Before test | 3 hours after | 6 hours after | 12 hours after |
| --- | --- | --- | --- | --- |
| Std. ZnS:Cu | 1.0 | 0.91 | 0.82 | 0.52 |
| $SrAl_2O_4$:Eu, Dy (Eu: 0.5 mol % Dy: 0.5 mol %) | 1.0 | 1.01 | 1.00 | 1.01 |
| $CaAl_2O_4$:Eu, Nd (Eu: 0.5 mol % Nd: 0.5 mol %) | 1.0 | 1.00 | 1.01 | 1.00 |
| $Sr_{0.5}Ca_{0.5}Al_2O_4$:Eu, Dy (Eu: 0.5 mol % Dy: 0.5 mol %) | 1.0 | 1.00 | 0.99 | 1.00 |
| $Sr_{0.5}Ba_{0.5}Al_2O_4$:Eu, Dy (Eu: 0.5 mol % Dy: 0.5 mol %) | 1.0 | 1.01 | 1.01 | 1.01 |
| $Sr_{0.5}Mg_{0.5}Al_2O_4$:Eu, Dy (Eu: 0.5 mol % Dy: 0.5 mol %) | 1.0 | 1.00 | 1.00 | 0.99 |

For use, phosphorescent phosphor according to the present invention may be coated on the surface of any of various products. It may also be mixed into a plastic material, rubber or glass.

Also, phosphorescent phosphor according to the present invention may replace conventional sulfide phosphorescent phosphors. The phosphorescent phosphor according to the present invention will show excellent characteristics in applying it to various gauges, dial plates of clocks, and safety signs, due to the long-lasting high-luminance afterglow characteristics thereof.

The phosphorescent phosphor according to the present invention can be employed in any of the following applications, because it has excellent long-lasting high-luminance afterglow characteristics and because it is an oxide and hence chemically stable and shows excellent photo-resistance.

Indicator for vehicles:airplane, ship, automobile, bicycle, key, key hole

Indicator for signs:traffic sign, indicator of traffic lanes, indicator for a guard rail, fishing buoy, direction board on a maintain trail, direction board which guides a guest from a gate to a front door, indication on helmet Outdoor indicator:signboard, indicator for buildings, indicator for the key hole of automobile, Indoor indicator:electrical appliance switches Stationery:writing instruments, luminous ink, map, star chart Toys:Jigsaw puzzle Special usage:sports ball, back-light for liquid-crystal (for use in, for example, clock), replacement of isotope used for discharge tube As described above, the present invention relates to a novel phosphorescent phosphor which is completely different from well-known sulfide phosphorescent phosphors, and has much longer high-luminance afterglow characteristics as compared with sulfide phosphorescent phosphors which are available on the market. Further, the phosphorescent phosphor according to the present invention is chemically stable because it is an oxide and has excellent photo-resistance.

What is claimed is:

1. A phosphorescent phosphor comprising a matrix expressed by $MAl_2O_4$ in which M is at least one metal element selected from a group consisting of calcium, strontium, and barium, wherein 0.001 % to 10% of europium is doped to said matrix expressed by $MAl_2O_4$ as an activator, and wherein 0.001% to 10% of at least one element selected from the group consisting of lanthanum, cerium, praseodymium, neodymium, samarium, gadolinium, dysprosium, holmium, erbium, thulium, ytterbium, lutetium, tin and bismuth is doped to said matrix expressed by $MAl_2O_4$ as a co-activator, in terms of mol % relative to the metal element expressed by M.

2. A phosphorescent phosphor comprising a matrix expressed by $MAl_2O_4$ in which M is plural metal elements which are composed of magnesium and at least one metal element selected from a group consisting of calcium, strontium, and barium, wherein 0.001% to 10% of europium is doped to said matrix expressed by $MAl_2O_4$ as an activator, and wherein 0/001% to 10% of at least one element selected from the group consisting of lanthanum, cerium, praseodymium, neodymium, samarium, gadolinium, dysprosium, holmium, erbium, thulium, ytterbium, lutetium, tin and bismuth is doped to said matrix expressed by $MAl_2O_4$ as a co-activator, in terms of mol % relative to the metal element expressed by M.

3. A phosphorescent phosphor according to claim 1 wherein said phosphorescent phosphor shows a glow peak of thermo-luminescence in a high-temperature region of 50° C. or above when irradiated by ultraviolet or visible rays having a wavelength of 200 to 450 nm at room temperatures.

4. A phosphorescent phosphor according to claim 2, wherein said phosphorescent phosphor shows a glow of thermo-luminescence in a high-temperature region of 50° C. or above when irradiated by ultraviolet or visible rays having a wavelength of 200 to 450 nm at room temperature.

* * * * *